(12) United States Patent
Sokol et al.

(10) Patent No.: US 8,020,102 B2
(45) Date of Patent: Sep. 13, 2011

(54) SYSTEM AND METHOD OF ADJUSTING AUDIOVISUAL CONTENT TO IMPROVE HEARING

(75) Inventors: Anthony B. Sokol, Beverly Hills, CA (US); Michael D. Orosz, Los Angeles, CA (US); James E. Ziegler, Burbank, CA (US); Barry Berk, Beverly Hills, CA (US)

(73) Assignee: Enhanced Personal Audiovisual Technology, LLC, Beverly Hills, CA (US)

( * ) Notice: Subject to any disclaimer, the term of this patent is extended or adjusted under 35 U.S.C. 154(b) by 311 days.

(21) Appl. No.: 11/503,468

(22) Filed: Aug. 11, 2006

(65) Prior Publication Data

US 2007/0039034 A1 Feb. 15, 2007

Related U.S. Application Data

(60) Provisional application No. 60/707,900, filed on Aug. 11, 2005.

(51) Int. Cl.
*G06F 3/16* (2006.01)
(52) U.S. Cl. .......... 715/727; 381/109; 381/310; 725/47
(58) Field of Classification Search .......... None
See application file for complete search history.

(56) References Cited

U.S. PATENT DOCUMENTS

| | | | | |
|---|---|---|---|---|
| 6,230,322 | B1 * | 5/2001 | Saib et al. | 725/40 |
| 6,243,676 | B1 * | 6/2001 | Witteman | 704/243 |
| 6,407,779 | B1 * | 6/2002 | Herz | 348/734 |
| 6,826,282 | B1 * | 11/2004 | Pachet et al. | 381/61 |
| 6,912,501 | B2 | 6/2005 | Vaudrey et al. | |
| 6,913,578 | B2 | 7/2005 | Hou | |
| 7,010,492 | B1 | 3/2006 | Bassett et al. | |

(Continued)

FOREIGN PATENT DOCUMENTS

EP 1 089 207 A2 4/2001

OTHER PUBLICATIONS

Michael Donald Orosz, "A Methodology for Developing and Controlling Human/Computer Interfaces", A dissertation submitted in partial satisfaction of the requirements for the degree Doctor of Philosophy in Computer Science at University of California, Los Angeles, Jun. 1999, 474 pages.

(Continued)

*Primary Examiner* — Scott Beliveau
*Assistant Examiner* — Patrick A Ryan
(74) *Attorney, Agent, or Firm* — Christie, Parker & Hale, LLP

(57) ABSTRACT

A system for adjusting audiovisual content having a server including a receiver for receiving a first content from a media source, a first circuitry configured to generate a second content based on the first content, the second content having multiple audio channels, a first transceiver for sending the second content to one or more clients, each client including a second transceiver for receiving the second content, and a second circuitry configured to generate a third content based on the second content and provide the third content to an audio device, wherein the second circuitry is configured to provide a graphical user interface to a user, the graphical user interface having a plurality of icons representing the user and the multiple audio channels, wherein movement of any of the plurality of icons will alter the second content.

44 Claims, 22 Drawing Sheets

U.S. PATENT DOCUMENTS

| | | | |
|---|---|---|---|
| 7,076,204 B2 * | 7/2006 | Richenstein et al. | 455/3.06 |
| 2002/0013698 A1 | 1/2002 | Vaudrey et al. | |
| 2004/0045030 A1 | 3/2004 | Reynolds et al. | |
| 2005/0086702 A1 * | 4/2005 | Cormack et al. | 725/135 |
| 2005/0220309 A1 * | 10/2005 | Hirata et al. | 381/18 |
| 2005/0276430 A1 * | 12/2005 | He et al. | 381/309 |

OTHER PUBLICATIONS

International Search Report for Application No. PCT/US06/031360 filed Aug. 11, 2006, dated Jun. 11, 2007, mailed Sep. 12, 2007, 2 pages.

Written Opinion for Application No. PCT/US06/031360 filed Aug. 11, 2006, dated Jun. 11, 2007, mailed Sep. 12, 2007, 2 pages.

* cited by examiner

| Operation | Resulting Modification to Audio Channels | Comments |
|---|---|---|
| Audio channel "graphical" icon is moved towards user "graphical" icon | Volume of audio channel represented by the "graphical" icon increases | Volume is electronically capped to avoid damage to human hearing due to user moving audio channel "graphical" icon too close to the user "graphical" icon. |
| Audio channel "graphical" icon is moved away from user "graphical" icon | Volume of audio channel represented by the "graphical" icon decreases | If "graphical" icon is moved too far from the user "graphical" icon, the user will not hear the contents of the audio channel. |
| User "graphical" icon is moved towards an audio channel "graphical" icon | The volume of the audio channel represented by the "graphical" icon increases | If the user "graphical" icon is moved towards a group of audio channels (represented by graphical icons), the volumes of the (group of) channels will increase. |
| User "graphical icon is moved away from an audio channel "graphical" icon | The volume of the audio channel represented by the "graphical" icon decreases | If the user "graphical" icon is moved away from a group of audio channels (represented by graphical icons), the volumes of those channels will decrease. |
| Audio channel "graphical" icon is repositioned in space with respect to the user "graphical" icon | The audio channel's perceived location changes. | For example, if an audio channel "graphical" icon is moved from the left of the user icon to the right of the user icon, the user will perceive the audio channel moving from the left to the right in audio space. |

FIG. 3a

| Attribute | Resulting Modification to Text Presentation | Comments |
|---|---|---|
| Placement | Position of text in user's visual field | This adjustment allows the user to tailor where in the visual field the text messaging should be presented. |
| Font Size | Defines the size of the text font | This adjustment allows the user to specify the size of the text displayed in the visual field. |
| Font Color | Defines the color of the text font | This adjustment allows the user to define the color of the font displayed in the visual field. |
| Text transparency | Defines how much of the "background" is allowed to show through the text | This adjustment allows the user to define how much of the background is allowed to "show through" the displayed text. This adjustment is useful in situations where the text may occlude (fully or partially) the film. |

FIG. 4a

| Byte | Purpose | Range | Comments |
|---|---|---|---|
| 1 | Header ID | 1BH, 02H, 04H, 06H, or 15H | Packet/Message header identifier |
| 2-4 | Number of bytes in message | 4 to 511<br>30H + 30H + 36H to<br>46H + 46H + 46H | Stored in Hex Format<br>Byte(2) = MSD<br>Byte(4) = LSD |
| 5-10 | Identifier of receiver | 000000 to FFFFFF<br>30H + 30H + 30H +<br>30H + 30H + 30H to<br>46H + 46H + 46H +<br>46H + 46H + 46H | Set to 00000 for broadcast |
| 11 | Command Identifier | 30H - A8H | Identifies the type of command operation to perform |
| 12 | Sub-command identifier | 30H - 42H | Identifies sub-category of command operation to perform |
| 13 | Read/Write operation | 30H - 31H | Read/write or set/sense operation<br>30H = read/sense<br>31H = write/set |
| 14-14+N | Audio Data/MetaData | Valid HEX ASCII characters | Data (N+1 bytes). See individual packet/message descriptions for details |
| 15+N<br>16+N | Message Checksum | 00H - FFH | Message checksum. Calculated in HEX. Stored as an ASCII string.<br>Byte(15+N) = MSD<br>Byte(16+N) = LSD |

FIG. 5a

| Byte | Purpose | Range | Comments |
|---|---|---|---|
| 1 | Command Header | 02H | Metadata Message header |
| 2-3 | Number of bytes in message | 11 (0BH) – 256 (FFH)<br>30H + 42H through 46H + 46H | Stored in Hex Format<br>Byte(2) = MSD<br>Byte(3) = LSD |
| 4-9 | Identifier of system to receive packet | 000000<br>30H + 30H + 30H + 30H + 30H + 30H | Broadcast address: 000000 |
| 10 | Number of audio channels | 32H through 38H | 2 Through 8 Channels |
| 11 | Type of Encoding | 31H | Type of encoding and error detection and correction<br>1 – Reed/Solomon |
| 12 | Sampling Frequency | 31H or 32H | Sampling rate of audio data<br>1 – 22MHz<br>2 – 44.1MHz |
| 13 | Type of compression | 30H | For now, no compression is used |
| 14 | Text data available flag | 30H or 31H | Flag used to indicate if text data is available for the audio<br>0 – No text data<br>1 – Text data is available and will be sent via another message packet |
| 15-15+N | Film Title | Each byte ranges from A-Z and 0-9. In Hex format | The title up to N characters in length. |
| 16+N – 17+N | Message Checksum | 00H – FFH | Message checksum. Calculated in hex. Stored as an ASCII string.<br>Byte(16+N) = MSD<br>Byte(17+N) = LSD<br><br>Note: 11+N can't exceed 256 bytes (FFH) |

FIG. 6c

| Byte | Purpose | Range | Comments |
|---|---|---|---|
| 1 | Command Header | 03H | Digital Audio Message header |
| 2-4 | Number of bytes in message | 7 = 007H through 4096 = FFFH (30H + 30H + 37H through 46H + 46H + 46H) | Stored in Hex Format Byte(2) = MSD Byte(3) = Middle Byte(4) = LSD |
| 5-10 | Identifier of receiver | 000000 30H + 30H + 30H + 30H + 30H + 30H | Broadcast address: 000000 |
| 11+N | Encoded Digital Audio data | Each byte ranges from 0-F (00H – 46H) | Multiplexed channels of digital data. |
| 12+N – 13+N | Message Checksum | 00H – FFH | Message checksum. Calculated in hex. Stored as an ASCII string. Byte(12+N) = MSD Byte(13+N) = LSD  Note: 13+N can't exceed 4096 bytes (FFFH) |

FIG. 6d

| Byte | Purpose | Range | Comments |
|---|---|---|---|
| 1 | Command Header | 04H | Digital Text Message header |
| 2-3 | Number of bytes in message | 16 through 256 (31H + 36H through 46H + 46H) | Stored in Hex Format Byte(2) = MSD Byte(3) = LSD |
| 4-9 | Address of receiver | 000000 30H + 30H + 30H + 30H + 30H + 30H | Broadcast: 000000 |
| 10-11 | Start time code (reel number) | 1 through 30 (30H + 31H through 33H + 30H) | Starting real when text should be displayed |
| 12-14 | Start time code (in film footage) | 1 through 4096 feet (30H + 30H + 31H through 46H + 46H + 46H) | Starting film footage when text should be displayed |
| 15-16 | End time code (reel number) | 1 through 30 (30H + 31H through 33H + 30H) | End reel when text should stop being displayed |
| 17-19 | Stop time code (in film footage) | 1 through 4096 feet (30H + 30H + 31H through 46H + 46H + 46H) | Film footage when text should stop being displayed |
| 20+N | Text message | Each byte ranges from A-Z and 0-9 in ASCII | Text message is of length N characters |
| 21+N – 22+N | Message Checksum | 00H – FFH | Message checksum. Calculated in hex. Stored as an ASCII string. Byte(21+N) = MSD Byte(22+N) = LSD  Note: 22+N can't exceed 256 bytes (FFH) |

FIG. 6e

| Byte | Purpose | Range | Comments |
| --- | --- | --- | --- |
| 1 | Command Header | 06H | ACK Message header |
| 2-3 | Number of bytes in message | 6 = 06H<br>30H + 36H | Stored in Hex Format<br>Byte(2) = MSD<br>Byte(3) = LSD |
| 4-9 | Address of receiver (sender) | 000000 – FFFFFF<br>(30H + 30H + 30H + 30H + 30H + 30H to 46H + 46H + 46H + 46H + 46H + 46H) | Address of sender of original packet. |
| 10 | ACK Code | 31H – 39H and 41H – 46H | TBD |
| 11-12 | Message Checksum | 00H - FFH | Message checksum. Calculated in hex. Stored as an ASCII string.<br>Byte(11) = MSD<br>Byte(12) = LSD |

FIG. 6f

| Byte | Purpose | Range | Comments |
| --- | --- | --- | --- |
| 1 | Command Header | 15H | NACK Message header |
| 2-3 | Number of bytes in message | 6 = 06H<br>30H + 36H | Stored in Hex Format<br>Byte(2) = MSD<br>Byte(3) = LSD |
| 4-9 | Address of sender | 000000 – FFFFFF<br>(30H + 30H + 30H + 30H + 30H + 30H to 46H + 46H + 46H + 46H + 46H + 46H) | Address of sender of original message |
| 4 | Error code | 31H through 36H and 41H through 45H | 31H – Undefined error<br>32H – Communications error (parity or framing problem)<br>33H – Time out<br>34H – Check sum error<br>35H – Unit is not in service<br>36H – Values are out of range |
| 5-6 | Message Checksum | 00H – FFH | Message checksum. Calculated in hex. Stored as an ASCII string.<br>Byte(5) = MSD<br>Byte(6) = LSD |

FIG. 6g

SYSTEM AND METHOD OF ADJUSTING AUDIOVISUAL CONTENT TO IMPROVE HEARING

CROSS-REFERENCE TO RELATED APPLICATION(S)

This application claims priority to and the benefit of U.S. Provisional Application No. 60/707,900 titled "Enhanced Personal Audiovisual Technology" filed on Aug. 11, 2005, the disclosure of which is expressly incorporated herein by reference in its entirety.

FIELD OF THE INVENTION

The present invention relates generally to a system for assisting individuals in the reception and understanding of information, including information transmitted in the audio and visual domains.

BACKGROUND

Hearing is an important part of communication and can often be impaired for varying reasons. In some instances, hearing is impaired due to physical conditions of the human auditory system. In other instances, hearing is impaired due to the saturation of the audio domain by a large number of audio stimuli or distractions from non-audio stimuli. One example is individuals immersed in noisy environments.

A variety of hearing impairments relate to physical conditions. Often an individual may have difficulty hearing in only one ear, or more difficulty hearing in one ear than the other. Some individuals may have difficulty hearing out of either ear. Each person's hearing impairments are unique in terms of which ear is impaired and the degree to which it is impaired. Individual impairments to hearing can also be associated with particular frequencies of audio. In this regard, it is desirable to have a system and method for adjusting audiovisual content to improve hearing.

SUMMARY

The present invention relates to a system and method for adjusting audiovisual content. In one embodiment, invention relates to a system for adjusting audiovisual content having a server including a receiver for receiving a first content from a media source, a first circuitry configured to generate a second content based on the first content, the second content having multiple audio channels, a first transceiver for sending the second content to one or more clients, each client including a second transceiver for receiving the second content, an audio device, and a second circuitry configured to generate a third content based on the second content and provide the third content to the audio device, where the second circuitry is configured to provide a graphical user interface to a user, the graphical user interface having a plurality of icons representing the user and the multiple audio channels, where, when a movement of an icon representing a first audio channel of the second content decreases a distance between the first audio channel icon and the user icon, the second circuitry is configured to increase a volume of the first audio channel, and maintain or decrease a volume of the audio channels of the second content other than the first audio channel, and where the second circuitry is configured to allow the user to maintain an unbalanced sound condition.

In another embodiment, the invention relates to a method of adjusting audiovisual content including receiving, at a server, a first signal having a first content from a media source, generating, at a server, a second content having multiple audio channels based on the first content, providing, at plurality of clients, a graphical user interface having a plurality of icons representing a user and the multiple audio channels, wherein the second content is altered by moving any of the icons on the graphical user interface, generating, at the plurality of clients, a third signal based on the second content, providing, at the plurality of clients, the third signal to an audio device, increasing, at the plurality of clients, a volume of a first audio channel of the second content when a movement of an icon representing the first audio channel decreases a distance between the first audio channel icon and the user icon, maintaining or decreasing, at the plurality of clients, a volume of the audio channels of the second content other than the first audio channel when a movement of the first audio channel icon decreases the distance between the first audio channel icon and the user icon, and allowing, at the plurality of clients, the user to maintain an unbalanced sound condition.

In yet another embodiment, the invention relates to a system for adjusting audiovisual content having a server configured to receive a first content from a media source, generate a second content having multiple audio channels based on the first content, and a plurality of clients, where each client is configured to receive the second content from the server, provide a graphical user interface to a user, the graphical user interface having a plurality of icons representing the user and the multiple audio channels, generate a third content based on the second content, provide the third content to an audio device, increase a volume of a first audio channel group including at least one of the multiple audio channels when a movement of the user icon decreases a distance between a first icon group, including the audio icons representing the audio channels of the first audio channel group, and the user icon, maintain or decrease a volume of the audio channels of the second content other than the audio channels of the first audio channel group when the movement of the user icon decreases the distance between the first icon group and the user icon, and allow the user to maintain an unbalanced sound condition.

In still yet another embodiment, the invention relates to a method of adjusting audiovisual content including receiving, at a server, a first signal having a first content from a media source, generating a second content having multiple audio channels based on the first content, providing, at plurality of clients, an input configured to allow a user to alter the multiple audio channels, generating, at the plurality of clients, a third signal based on the second content, providing, at the plurality of clients, the third signal to an audio device, increasing, at the plurality of clients, a volume of a first audio channel group including at least one of the multiple audio channels when a movement of the user icon decreases a distance between a first icon group, including the audio icons representing the audio channels of the first audio channel group, and the user icon, maintaining or decreasing a volume of the audio channels of the second content other than the audio channels of the first audio channel group when the movement of the user icon decreases the distance between the first icon group and the user icon, and allowing the user to maintain an unbalanced sound condition.

BRIEF DESCRIPTION OF THE DRAWINGS

FIG. 3a is a table that lists characteristics of a graphical user interface in accordance with an embodiment of the present invention;

FIG. 4a is a table that lists characteristics of a graphical user interface in accordance with an embodiment of the present invention;

FIG. 5a illustrates a general message packet format in accordance with an embodiment of the present invention;

FIG. 6c illustrates the format of a metadata packet in accordance with an embodiment of the present invention;

FIG. 6d illustrates the format of a audio packet in accordance with an embodiment of the present invention;

FIG. 6e illustrates the format of a video packet in accordance with an embodiment of the present invention;

FIG. 6f illustrates the format of an acknowledgement packet in accordance with an embodiment of the present invention;

FIG. 6g illustrates the format of an NACK packet in accordance with an embodiment of the present invention.

DETAILED DESCRIPTION

Figure 1A:
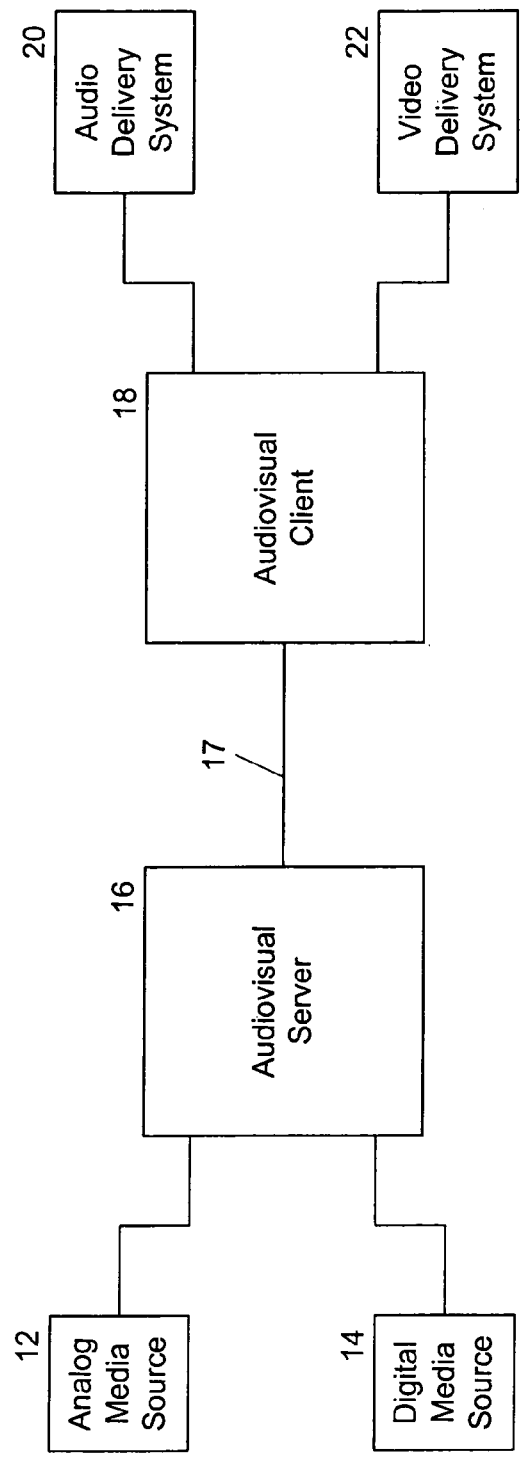
FIG. 1a is a schematic block diagram of an audiovisual content adjustment system in accordance with an embodiment of the present invention.

Referring now to the drawings, audiovisual content adjustment systems in accordance with embodiments of the present invention are illustrated. Audiovisual content adjustment systems can allow a user to individually and graphically customize the channels or subcomponents of audio content and video content from a media source to suit the user's preferences. In some cases, the user's preferences will be tailored to overcome impairments to the user's hearing. The user can often express his preferences visually with the use of a graphical user interface. The user can adjust the audio content using a graphical user interface depicting a room or theater with a multi-channel speaker system, as in FIGS. 3b-3i.

Often a multichannel audio system will include six speakers comprising center, right, left, right surround, and left surround speakers, as well as a special effects speaker, which is typically a subwoofer. By moving icons representing speakers and/or the user, the user can control the way the audio content sounds when played on an audio delivery system, like a pair of headphones. For example, if the center speaker icon is moved closer to the icon depicting the user, then the volume of the center speaker relative to the other speakers will be increased when played on the user's headphones. The increase in volume can be in proportion to the distance that the center speaker icon is moved.

Video content from the media source can supplement the audio content by providing close-captioning text representing the audio content delivered to the audio delivery system. Characteristics, such as size, color and transparency of the text, describing how the video content is presented to the user can be customized using a graphical user interface. In one embodiment, the video content and graphical user interface is presented to the user by a video delivery system such as a heads-up display.

Figure 1B:
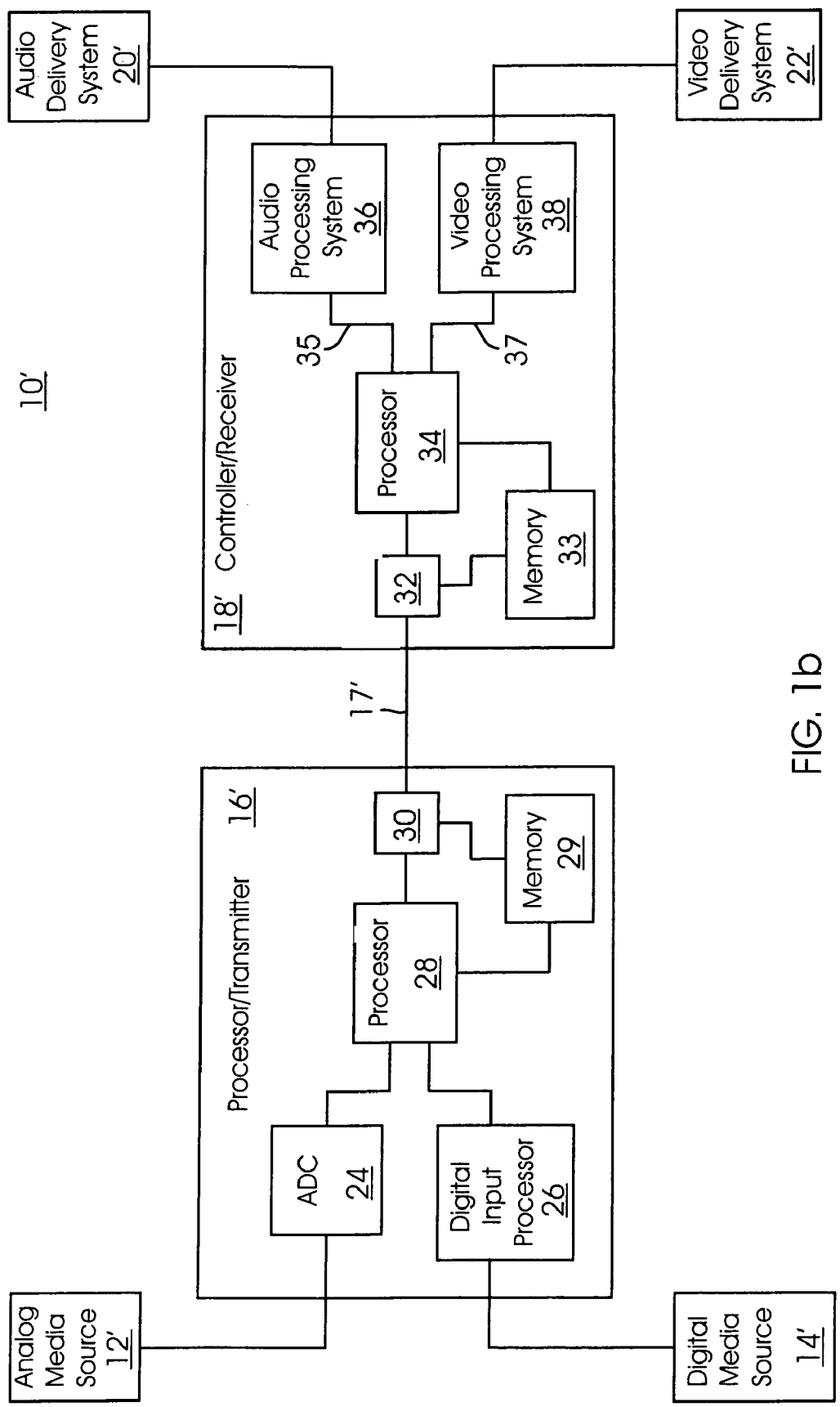
FIG. 1b is a schematic block diagram of an audiovisual content adjustment system in accordance with another embodiment of the present invention.

A system for transporting audio content, video content including the close-captioning text and any other appropriate content to the user from a media source can include a communication channel capable of transporting digital message packets, as in FIGS. 1a and 1b. The audio and video content can be received from various analog and digital media sources and then separated using an audiovisual server. The audiovisual server can send the audio and video content separately in packet format to an audiovisual client. In such a case, the audiovisual client receives and identifies packets of different formats. Packets formats can include audio, video and metadata packets. Metadata packets describe the content of data in the other packets. For example, a metadata packet might describe the author, title, and/or year recorded of a film currently being played with the audiovisual content system.

A schematic block diagram of an audiovisual content adjustment system in accordance with an embodiment of the present invention is shown in FIG. 1a. The audiovisual content adjustment system 10 includes an analog media source 12, a digital media source 14, an audiovisual server 16, a communication channel 17, an audiovisual client 18, an audio delivery system 20 and a video delivery system 22. The analog media source 12 and digital media source 14 are connected to the audiovisual server 16. The audiovisual server 16 is connected to the audiovisual client 18 via the communication channel 17. The audiovisual client 18 is connected to the audio delivery system 20 and the video delivery system 22.

In operation, the audiovisual server 16 can receive audio content, video content, and/or other appropriate content from the analog media source 12 and/or the digital media source 14. If the media source is analog, then the analog audio and/or video content can be converted into a digital form. The digital audio and/or video content can then be segmented into packets such that some packets carry audio content and some packets carry video content while other packets carry metadata or other appropriate content. The metadata can be thought of as information describing other content, such as information describing the characteristics of audio content.

The audiovisual server 16 can then transport the packets to the audiovisual client 18 over the communication channel 17.

The audiovisual client 18 can receive the packets and separate them according to type. The audiovisual client can include a graphical user interface capable of determining user preferences for modifying audio content. The packets of audio content can be processed according to user preferences determined using the graphical user interfaces and delivered to an audio delivery system 20.

The audio delivery system 20 can allow a user to listen to the audio content with, for example, a pair of headphones. The packets of video content can be processed according to user preferences determined using the graphical user interfaces and delivered to a video delivery system 22. The packets of metadata can be processed and also delivered to the video delivery system 22.

In many embodiments, a user of the audiovisual adjustment system can make changes to the way audio content is presented on the audio delivery system. In several embodiments, a user of the audiovisual adjustment system can make changes to the way the video content, often in the form of close-captioning text, is presented on the video delivery system.

In many embodiments, the user makes changes to the presentation of audio content using a graphical user interface. In some embodiments, the user makes changes the presentation of video content and/or metadata using a graphical user interface.

In one embodiment, communication via the communication channel is achieved using an analog signal over a wireless system. In this case, audio and video content in analog form is transported by the audiovisual server to the audiovisual client.

A schematic block diagram of an audiovisual content adjustment system in accordance with an embodiment of the present invention is shown in FIG. 1b. The audiovisual content adjustment system 10' includes an analog media source 12', a digital media source 14', a processor/transmitter 16', a communication channel 17', a controller/receiver 18', an audio delivery system 20' and a video delivery system 22'. The analog media source 12' and digital media source 14' are connected to the processor/transmitter 16'. The processor/transmitter 16' is connected to the controller/receiver 18' via the communication channel 17'. The controller/receiver 18' is connected to the audio delivery system 20' and the video delivery system 22'.

In operation, the processor/transmitter 16' can act as an audiovisual server and the controller/receiver 18' can act as an audiovisual client. The processor/transmitter 16' can receive audio and/or video content from the analog media source 12' in analog form. The processor/transmitter 16' can receive audio and/or video content from the digital media source 12' in digital form.

Analog media sources can include music playback systems, film playback systems, audio playback systems, public address systems, broadcast media systems and other appropriate analog media sources. Digital media sources can include music playback systems such as compact disc (CD) players, film playback systems such as digital video disc (DVD) players or digital film processors, audio playback systems, and other appropriate digital media sources.

The processor/transmitter 16' can receive, process, and transmit the audio and/or video content over the communication channel 17' to the controller/receiver 18'. The controller/receiver 18' can receive, process and distribute the audio and/or video content received from the processor/transmitter 16' to both the audio delivery system 20' and video delivery system 22'.

The processor/transmitter 16' includes an analog to digital converter (ADC) 24, a digital input processor 26, a processor 28, a memory 29, and a transceiver 30. The processor 28 is connected to the ADC 24, the digital input processor 26, the memory 29 and the transceiver 30. The transceiver 30 is connected to the communication channel 17' and the memory 29. The ADC 24 is connected to the analog media source 12'. The digital input processor 26 is connected to the digital media source 14'.

In operation, the ADC 24 converts analog media received from the analog media source 12' to digital media. The digital input processor 26 processes the media from the digital media source into a format suitable for the processor 28 and for storing the media in the memory 29. In one embodiment, digital media sources can include digital audio, digital text corresponding to the digital audio, and digital time codes. The processor assembles the digital audio and/or video content into packets. The packets may include packets of audio content, video content including close-captioning text, and metadata.

In assembling the packets of audio content, the processor multiplexes multiple channels of audio to comprise the audio data to be contained in the audio packet. Thus, the audio data contains portions of data each attributable to one of the audio channels. In one embodiment, the processor multiplexes six channels of audio including a center, left, right, left surround, right surround, and special (often a subwoofer) channel. In other embodiments, the number of channels can be more than or less than six.

The processor sends the packets to the transceiver 30 to be transmitted on the communication channel 17'. In one embodiment, the transceiver 30 has its own memory (not shown) or uses the memory 29 to buffer packets to be transmitted on the communication channel 17'.

The controller/receiver 18' includes a transceiver 32, a memory 33, a processor 34, an audio communication channel 35, an audio processing system 36, a video communication channel 37 and a video processing system 38. The transceiver 32 is connected to the communication channel 17' and the memory 33. The processor 34 is connected to the transceiver 32, the memory 33, the audio processing system 36 via the connection 35 and the video processing system 38 via the connection 37. The audio processing system 36 is connected to the audio delivery system 20'. The video processing system 38 is connected to the video delivery system 22'. The controller/receiver can include other components that facilitate the receipt, processing and conversion of packets. For example, additional memory or processors can be used.

In operation, the transceiver 32 receives packets from the communication channel 17' and sends them to the processor 34. In one embodiment, the transceiver 32 sends data to the processor/transmitter 16'. For example, the transceiver can send an acknowledgement of receipt of a packet. The processor 34 or transceiver 32 can store packets in the memory 33 as needed to buffer the received audio and/or video content. The processor 34 identifies the type of packet received and sends it to the appropriate system. The processor 34 sends packets of audio content to the audio processing system and packets of video and/or metadata content to the video processing system 38. The audio processing system converts the packets of audio content into a form suitable for the audio delivery system. In one embodiment, the audio delivery system is a pair of headphones. The video processing system converts the packets of video content and/or metadata into a form suitable for the video delivery system. In one embodiment, the video delivery system is a heads-up display system which is capable of displaying text within the field of vision of a user.

In one embodiment, the processor/transmitter 16' can be implemented using a combination of processing elements such as digital signal processors (DSPs), programmable logic, discrete logic components and/or other circuitry capable of sharing information. In one embodiment, the controller/receiver 16' can be implemented using a combination of processing elements such as digital signal processors (DSPs), programmable logic, discrete logic components and/or other circuitry capable of sharing information.

In several embodiments, the communication channel 17' can be a wireless communication channel. In several embodiments, the wireless communication channel can use radio frequency (RF) bands to communicate. In one embodiment, the wireless protocol can comply with the IEEE 802.11 or related family of wireless protocols including Wi-Fi. In another embodiment, the wireless protocol can comply with the Bluetooth, or IEEE 802.15.1, standard. The wireless communication channel can use any number of appropriate protocols for sending packets. In one embodiment, the frequency band used for wireless communication can include cell-phone bands such as 900 MHz. In other embodiments, other cell-phone bands can be used.

In one embodiment, the communication channel can be a wired communication channel. The wired communication channel can be a copper wire, twisted pair, fiber or other appropriate medium.

Figure 1C:
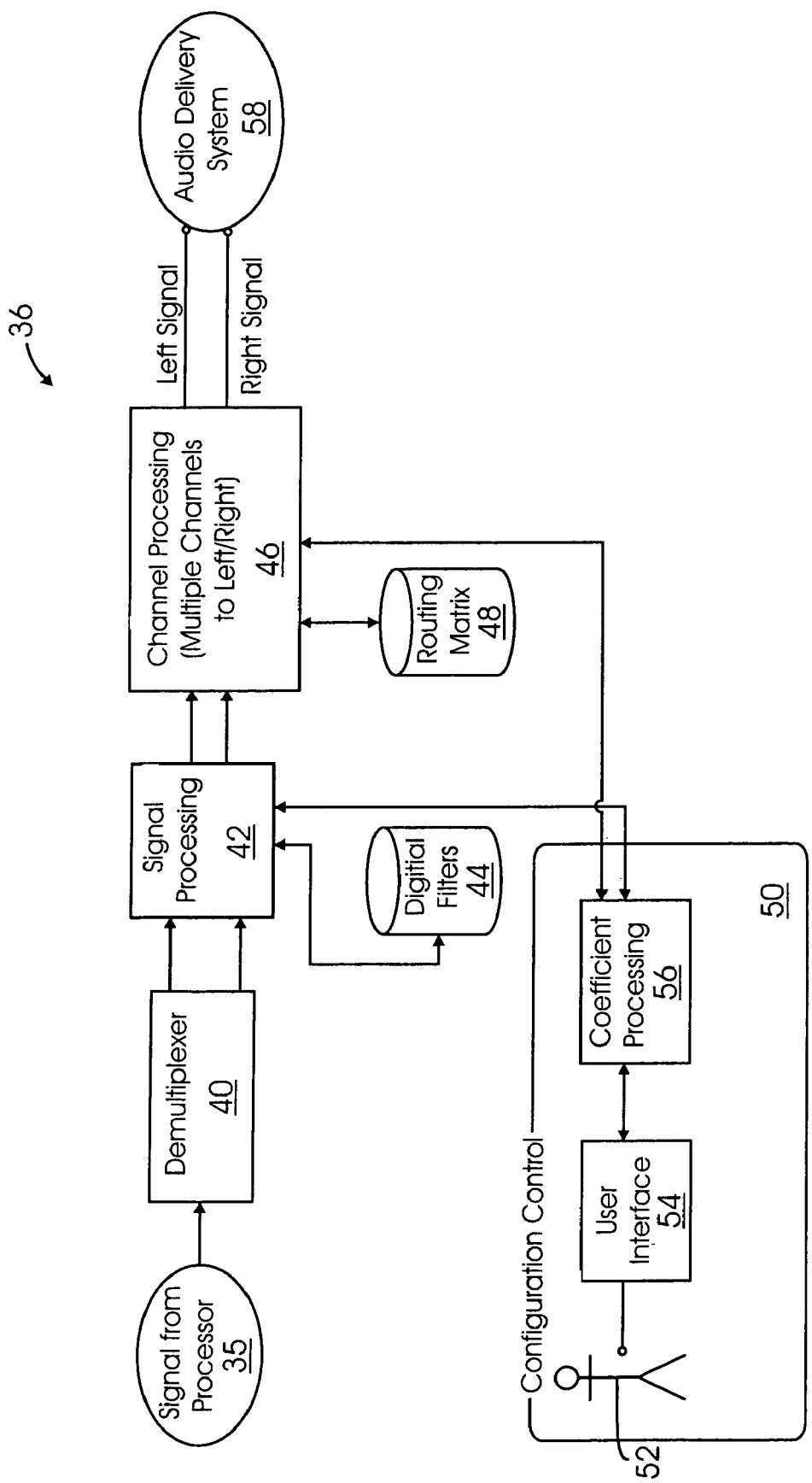
FIG. 1c is a functional block diagram of an audio processing system in accordance with the embodiment of FIG. 1b.

A functional block diagram of an audio processing system in accordance with an embodiment of the present invention is shown in FIG. 1c. The audio processing system 36 includes a signal from the processor 35, a demultiplexer 40, signal processing 42, digital filters 44, channel processing 46, a routing matrix 48, a configuration control block 50, a user interface 54, coefficient processing 56 and a audio delivery system 58. The demultiplexer is connected to the signal from the processor 35 and the signal processing block 42. The signal processing block 42 is connected to the digital filters 44, the coefficient processing block 56 and the channel processing block 46. The coefficient processing block 56 is connected to the user interface 54 and the channel processing block 46. The channel processing block 46 is connected to the routing matrix 48 and the audio delivery system 58.

In operation, the demultiplexer 40 can receive packets of audio data from the signal from the processor 35 and separate the multiple channels of audio that have been multiplexed into the audio packet (i.e. demultiplex the multiple channels of audio content). The demultiplexer 40 can send the demultiplexed audio content (now comprising multiple channels) to the signal processing block 42. The signal processing block 42 can apply digital filters 44 and coefficient processing 56 to process the multiple channels of audio content according to the preferences of the user 52. The coefficient processing 56 takes input from the user interface 54 which can receive input from a user 52. The user 52 can provide input indicating any changes he/she would prefer in the characteristics of the audio content. In one embodiment, user preferences can include the volume of any channel or position information relating to the location of each channel relative to the other channels.

The coefficient processing block 56 develops the parameters necessary to modify the audio content as indicated by the user and sends those parameters to both the signal processing block 42 and the channel processing block 46. The signal processing block 42 modifies the audio content according to the user parameters from the coefficient processing. In one embodiment, the audio configuration preferences are stored (i.e. default settings) and can be recalled after the user is identified using the user interface.

In modifying the audio content, the signal processing block 42 may increase or decrease the volume of any of the multiple audio channels according to the preferences of the user. After the audio content is filtered per the user's preferences, the channel processing block 46 uses the routing matrix 48 and user preferences to combine the multiple channels of audio content into two channels, a left channel and a right channel. The channel processing block adjusts the volumes of the left and right channels according the user preferences and/or default settings. The left and right channels can be converted to analog format. An audio delivery system 58 receives the right and left channels from the channel processing block 46.

In one embodiment, the audio delivery system is a pair of headphones. In another embodiment, the audio delivery system 36 can be one or more speakers. In one embodiment, the processing in the audio processing system 36 can be performed by a single processor, such as the controller/receiver processor 34. In other embodiments, the audio processing system 36 can be implemented using a combination of processing elements such as digital signal processors (DSPs), programmable logic, discrete logic components and/or other circuitry capable of sharing information.

Figure 1D:
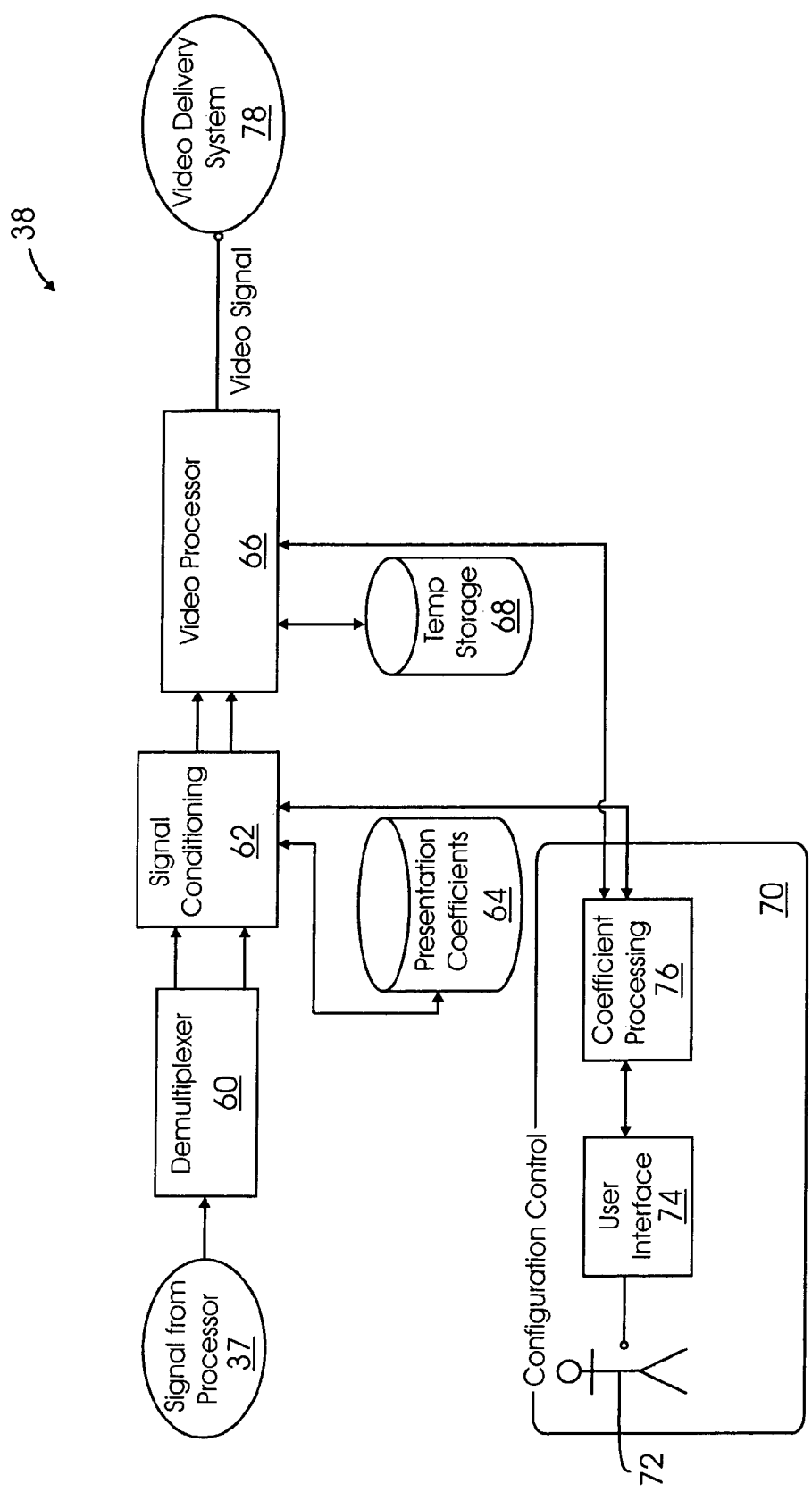
FIG. 1d is a functional block diagram of a video processing system in accordance with the embodiment of FIG. 1b.

A functional block diagram of an video processing system in accordance with an embodiment of the present invention is shown in FIG. 1d. The video processing system 38 includes a signal from the processor 37, a demultiplexer 60, a signal conditioning block 62, presentation coefficients 64, a video processor 66, a temporary storage 68, a configuration control block 70, a user interface 74, coefficient processing 76 and a video delivery system 78. The demultiplexer 60 is connected to the signal from the processor 37 and the signal conditioning block 62. The signal conditioning block 62 is connected to the presentation coefficients 64, the coefficient processing block 76 and the video processor 66. The coefficient processing block 76 is connected to the user interface 74 and the video processor 66. The video processor 66 is connected to the temporary storage 68 and the video delivery system 78.

In operation, the demultiplexer 60 can receive packets of video data from the signal from the processor 37 and separate the text data and timing data that have been multiplexed into the video packet (i.e. demultiplexes the text and timing data). The demultiplexer 60 can send the demultiplexed video content to the signal conditioning block 62. The signal processing block 62 can apply presentation coefficients 64 and coefficient processing 76 to process the demultiplexed video content. The coefficient processing 76 takes input from the user interface 74 which can receive input from a user 72. The user 72 can provide input indicating the changes he/she would prefer in the characteristics of the video content.

The coefficient processing block 76 develops the parameters necessary to modify the video content as indicated by the user and sends those parameters to both the signal conditioning block 62 and the video processor 66. The signal conditioning block 62 modifies the video content according to the user parameters from the coefficient processing 76. In one embodiment, the video configuration preferences are stored (i.e. default settings) and can be recalled after the user is identified using the user interface.

In modifying the video content, the signal conditioning block 62 can modify the size, color, translucence and any other appropriate video content characteristics according to the preferences of the user. After the video content is modified according to the user's preferences, the video processor 66 uses temporary storage 68 and the user's preferences to present video data, at the time specified by time codes and converted to a analog video signal, to the video delivery system 78.

In one embodiment, the video delivery system is a lightweight head-mounted visual projection system suitable for use with this invention such as the monochrome Nomad system by Microvision, Inc of Bothell, Wash. in which the visual image (i.e., text and graphic images) is projected directly to the back of the retina. The Nomad system is a scan-beamed display system that focuses low-power lasers into the fovea area of the retina allowing for images to be "laid" over the viewer's view of real objects. The Nomad system is monochrome; the default text color is red, which has proven a suitable font color in automotive applications.

In other embodiments, the video delivery system can be any system suitable for displaying text. In one embodiment, the processing in the video processing system 38 can be performed by a single processor, such as the controller/receiver processor 34. In one embodiment, the video processing system 38 can be implemented using a combination of processing elements such as digital signal processors (DSPs), programmable logic, discrete logic components and/or other circuitry capable of sharing information.

Figure 2A:
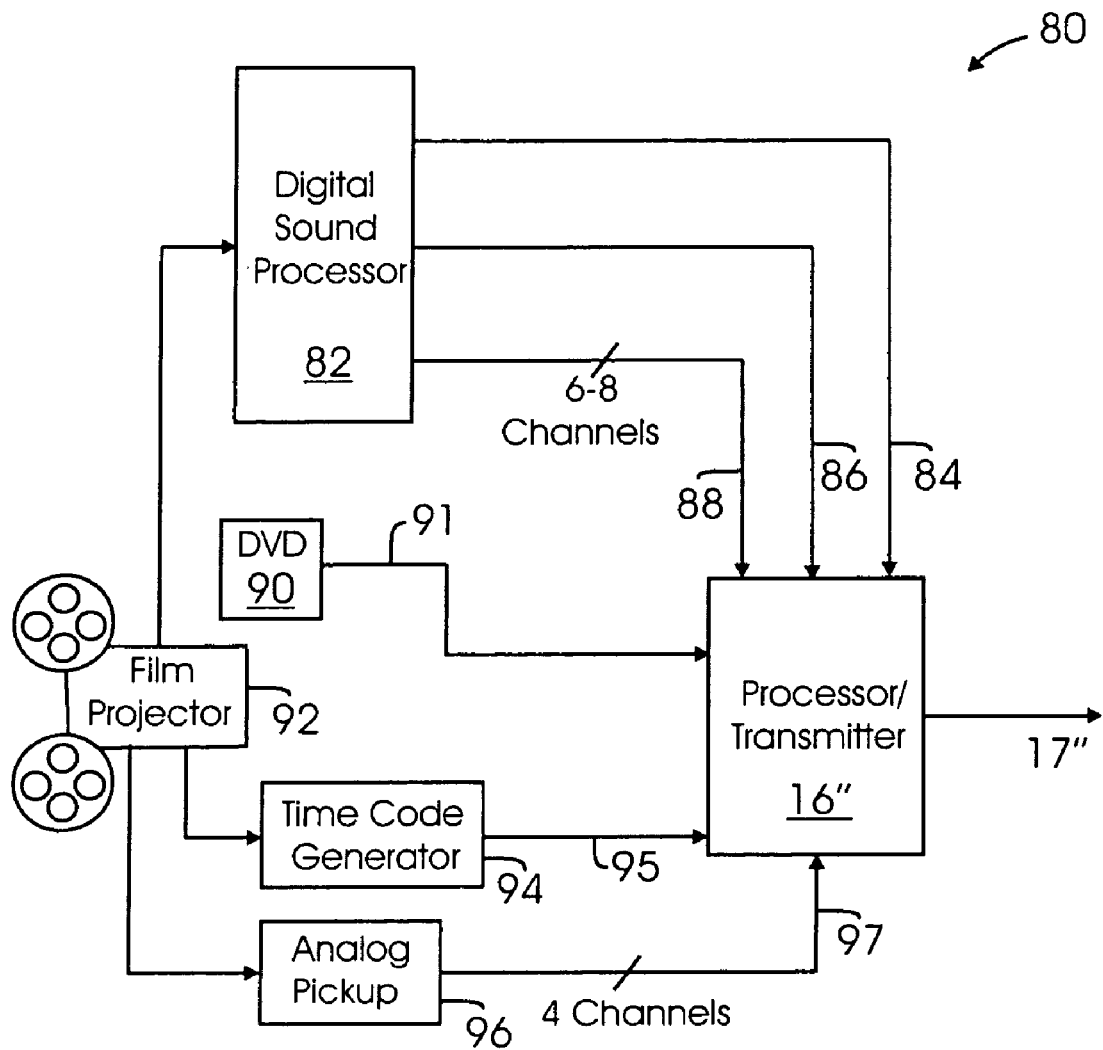
FIG. 2a is a schematic block diagram of a processor/transmitter interface and several media sources in accordance with another embodiment of the present invention.

A schematic block diagram of a processor/transmitter interface and several media sources in accordance with an embodiment of the present invention are shown in FIG. 2*a*. The system 80 includes a digital sound processor 82, communication channels 84, 86, 88, 91, 95, 97, a DVD source 90, a film projector 92, a time code generator 94, an analog pickup 96, a processor/transmitter 16" and a communication channel 17".

The digital sound processor 82 is connected to the film projector 92 and the processor/transmitter 16" by channels 88, 86 and 84. In one embodiment, the digital sound processor is a Sony DFP-D3000 made by Sony Corp. of Tokyo, Japan. The DVD source 90 is connected to the processor/transmitter 16" via channel 91. The time code generator 94 is connected to the film projector 92 and to the processor/transmitter 16" via channel 95. The analog pickup 96 is connected to the film projector 92 and to the processor/transmitter 16" via channel 97.

The channel 84 is a single digital signal and can transport multiplexed time code data. The channel 86 is a single digital channel and can transport error data and time code data. The channel 88 can be comprise a number of distinct audio channels. In one embodiment, the channel 88 comprises six audio channels. In other embodiments, the channel 88 comprises more than or less than six channels. The channel 91 can include digital data comprising video, audio, text, metadata, and/or time code data from the DVD 90. The time code generator can generate a digital signal that provides information for synchronizing the analog audio content with the associated video content, including close-captioning text. In one embodiment, the output of the film projector includes both analog time code information and analog audio. The channel 95 can transport a digital time code signal. The channel 97 can transport multiple analog audio channels. In one embodiment, the channel transports 97 four analog audio channels. In other embodiments, the channel 97 transports more than or less than four audio channels. In one embodiment, the processor/transmitter 16" operates as described in the discussion of FIG. 1*b*.

Figure 2B:
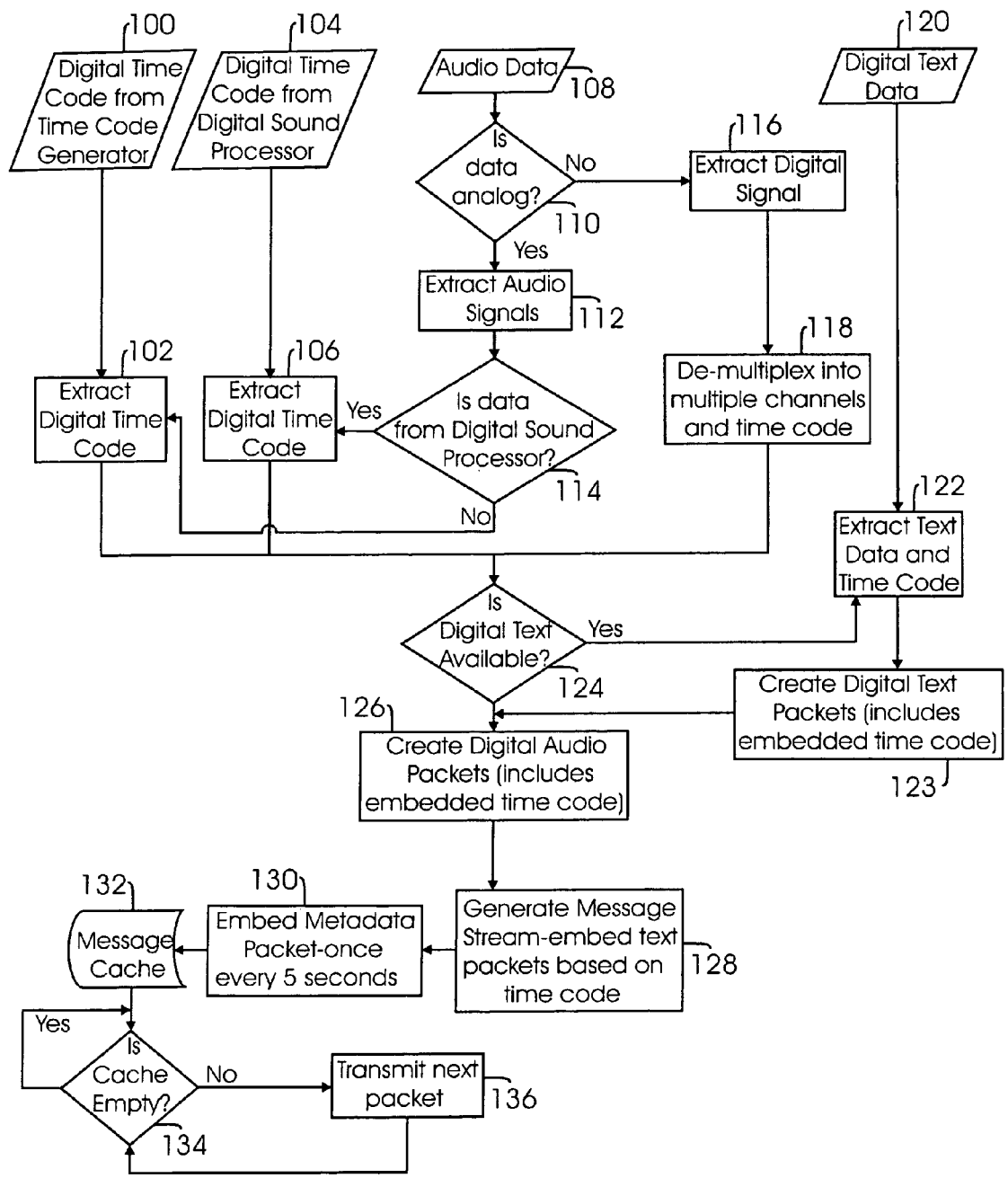
FIG. 2b is a flowchart illustrating a process for operating a processor/transmitter in accordance with an embodiment of the present invention.

A flowchart illustrating a process for operating a processor/transmitter (P/T) in accordance with an embodiment of the present invention is shown in FIG. 2*b*. The P/T receives audio data (108). If the data is analog (110), then the P/T extracts (112) audio signals. In one embodiment, the rate of extraction is 44.1 MHz per channel. If the data is from a digital sound processor (DSP) (114), then the P/T extracts digital time code (106) from the digital time code from the DSP 104. If the data is not from a DSP, then the P/T extracts (102) digital time code from the digital time code from the time code generator (100). If the audio data is not analog (110) (i.e. audio data is digital), then the P/T extracts (116) the digital signal. The P/T demultiplexes (118) the digital data into multiple channels and time codes. If digital text is available (124), then the P/T extracts (122) the text data and time code and creates (123) digital text packets including embedded time codes.

The P/T then creates (126) digital audio packets including embedded time codes. The P/T then generates (128) a message stream that includes the digital audio packets and embedded text packets based on time codes. In one embodiment, audio and text are synchronized by the time code and text packets are embedded into the stream based on the time code. In one embodiment, text can be displayed on the video display device for at least ten seconds and thus the message stream can be dominated by audio packets. The P/T then embeds 130 metadata packets every five seconds. In other embodiments, the P/T can embed metadata more often or less often than five seconds. The P/T then stores the packets in a message cache (132) to be transmitted. If the cache is empty (134), then the P/T keeps checking to see if the message cache is empty. If the cache is not empty, then the P/T transmits (136) the next packet.

In one embodiment, packets are transmitted at a rate to ensure adequate playback of audio content. In one embodiment, packets can be broadcast to all controller/receivers (i.e. without individual addressing). In other embodiments, other suitable processes can be used to extract multiple channels of audio, time code and accompanying text while also packaging and transmitting the information.

Figure 2C:
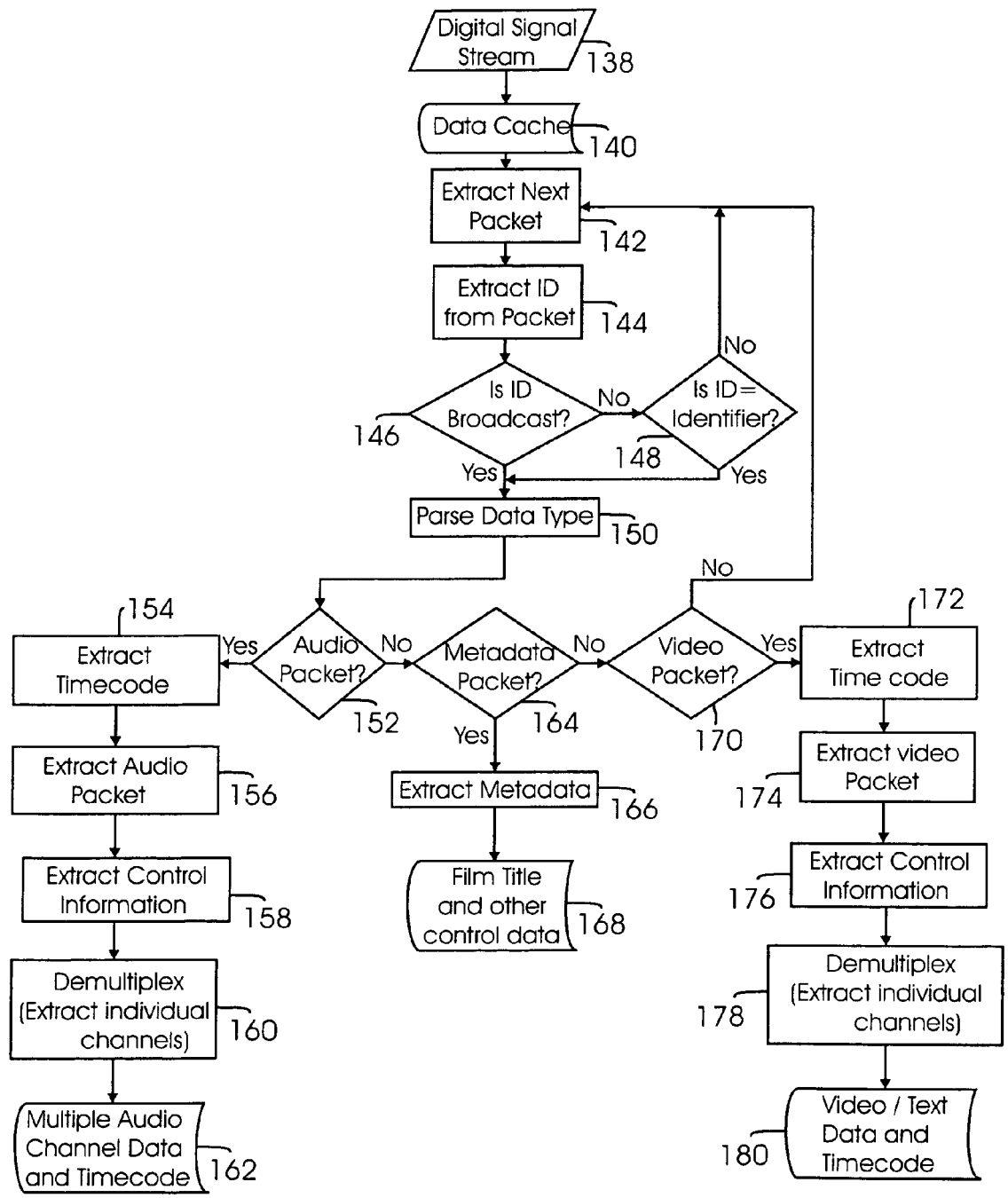
FIG. 2c is a flowchart illustrating a process for operating a controller/receiver in accordance with an embodiment of the present invention.

A flowchart illustrating a process for operating a controller/receiver (C/R) in accordance with an embodiment of the present invention is shown in FIG. 2*c*. The C/R is provided a digital signal stream (138). The C/R temporarily stores incoming packets in a data cache (140). The C/R extracts (142) the next packet from the cache and extracts (144) the identifier of the intended receiver from the packet. The general message packet format in accordance with one embodiment of the present invention is shown in FIG. 5*a*. The identifier of the receiver occupies bytes 5-10 of the general message packet.

Returning to the flowchart of FIG. 2*c*, if the identifier indicates that the packet is not a broadcast packet (146), then the C/R checks if the unique identifier of the C/R matches (148) the packet identifier. If the unique identifier of the C/R does not match the packet identifier, then the C/R extracts (142) the next packet. If either the packet is a broadcast packet or matches the unique C/R identifier, then the C/R parses (150) the packet to determine the type of packet (i.e. digital audio, digital text, metadata, etc.). If the packet/message header identifier (byte 1 of the packet) indicates that the packet is an audio packet (152), then the C/R extracts (154) time code information, extracts (156) the audio packet data and extracts (158) the control information. The C/R then demultiplexes (160) individual channels of audio content. The C/R then stores (162) the multiple audio channel data and time code data, which can be provided to the audio processing system 36.

If the packet is not an audio packet (152), then the C/R checks to see if the packet is a metadata packet (164). If the packet is a metadata packet, the C/R extracts (166) the metadata (often in the form of film title and other control information) and stores (168) it. If the packet is not a metadata packet, then the C/R checks to see if the packet is a video packet (170). If the packet is not a video packet, then the C/R extracts (142) the next packet. If the packet is a video packet, then the C/R extracts (172) time code information, extracts (174) the video packet data and extracts (176) the control information. The C/R then demultiplexes (178) the video content (text) and time code data. The C/R then stores (180) the text and time code data, which can be provided to the audio processing system 36.

Figure 2D:
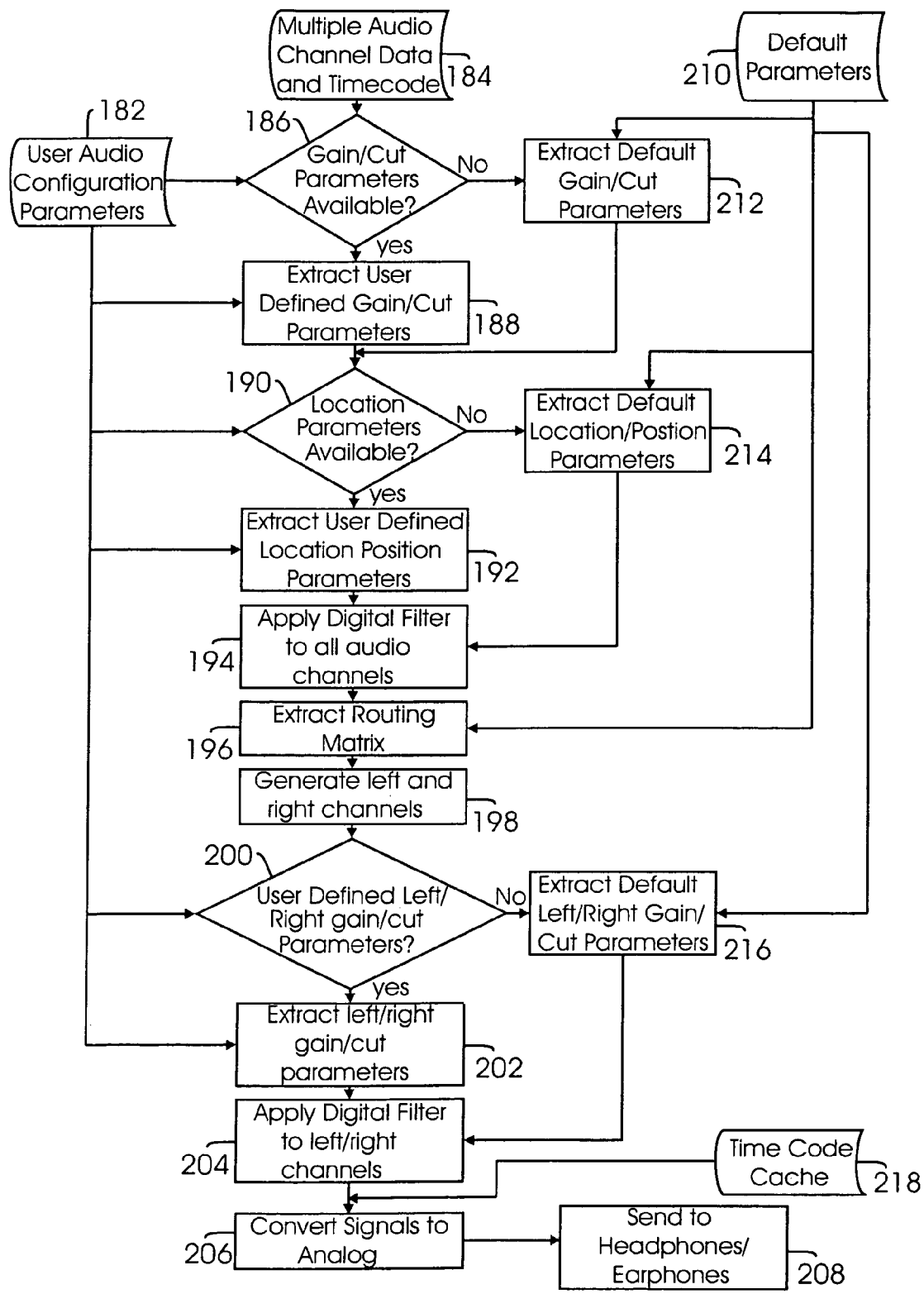
FIG. 2d is a flowchart illustrating a process for operating a audio processing system in accordance an embodiment of the present invention.

A flowchart illustrating a process for operating a audio processing system in accordance with an embodiment of the present invention is shown in FIG. 2d. Multiple channel audio data and time code data (184), user audio configuration parameters (182), and default parameters (210) are provided to the process. The processor checks to see if gain/cut parameters are available (186) from the user audio configuration parameters.

If gain/cut parameters are not available, then the processor extracts (212) the default gain/cut parameters from the default parameters. If the gain/cut parameters are available, then the processor extracts (188) the gain/cut parameters from the user audio configuration parameters. The processor then checks to see if the location parameters are available (190). If the location parameters are not available, then the processor extracts (214) the default location/position parameters from the default parameters. If the location parameters are available, then the processor extracts (192) the user defined location/position parameters.

The processor then applies (194) the digital filter to all the audio channels. The processor then extracts (196) a routing matrix from the default parameters. In one embodiment, the routing matrix can indicate the way in which a system with more than two channels is to be converted to a system with only two channels (i.e. right and left audio channels). After extracting the routing matrix, the processor generates (198) left and right channels. The processor then checks to see if the user defined (200) left and/or right gain or cut parameters. If the user did not define left and/or right gain or cut parameters, then the left and/or right gain or cut parameters are extracted (216) from the default parameters.

If the user did define left and/or right gain or cut parameters, then the left and/or right gain or cut parameters are extracted (202) from the user defined parameters. The processor then applies (204) a digital filter to the left and right channels. With the use of the digital filter, the processor can modify the left and right channels according to the specified parameters. The process is provided data from the time code cache (218). The processor uses the time code cache in converting (206) the left and right channels to analog signals. The analog signals can then be sent to headphones or earphones (208).

Figure 2E:
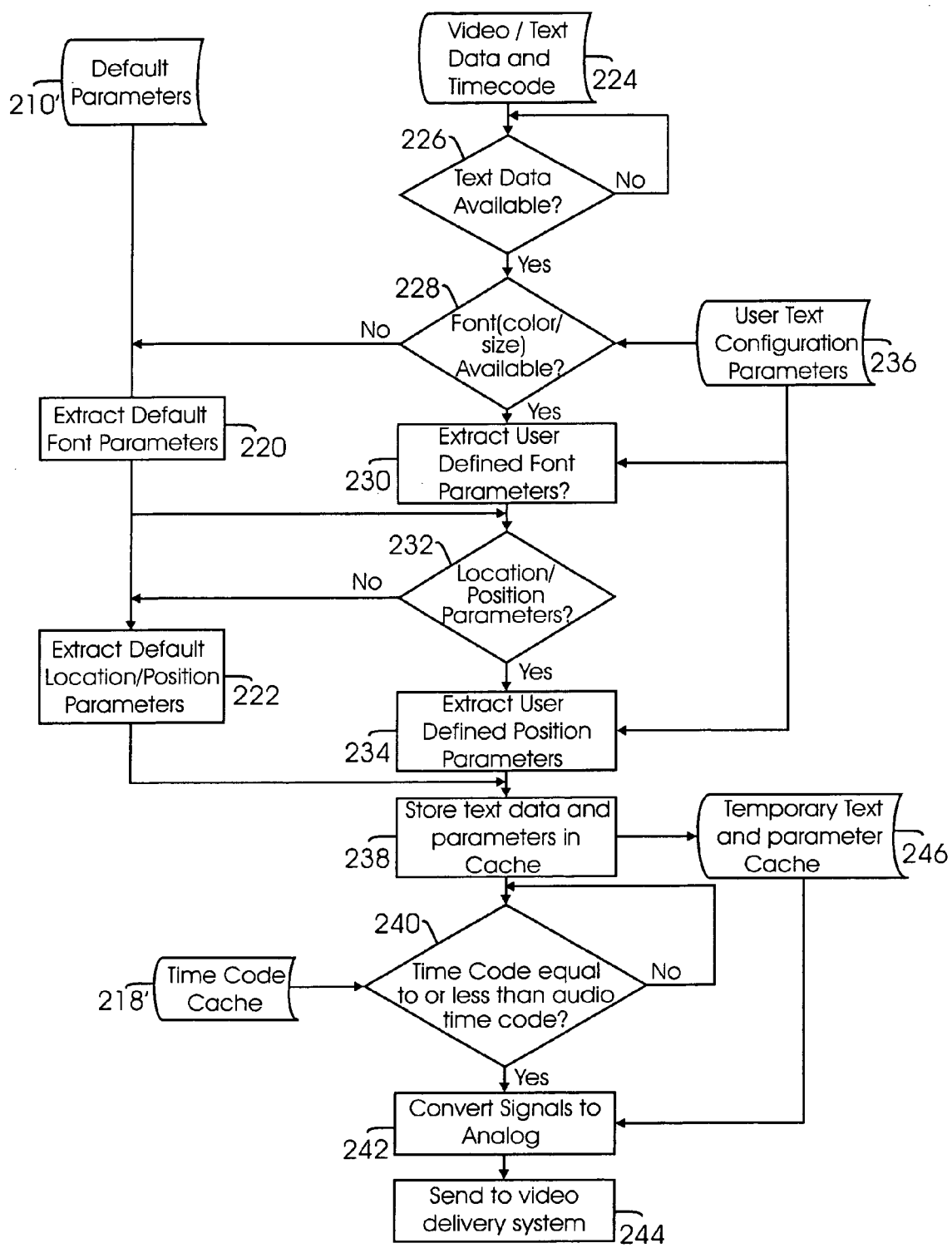
FIG. 2e is a flowchart illustrating a process for operating a video processing system in accordance an embodiment of the present invention.

A flowchart illustrating a process for operating a video processing system in accordance with an embodiment of the present invention is shown in FIG. 2e. Default parameters (210'), video and/or text data and time code data (224), user text configuration parameters (236), and time code cache data (218') are provided to the process. The processor checks the video/text and time code data to see if text data is available (226). If text data is not available, then the processor checks again for text data within the video/text and time code data. If text data is available, then the processor checks to see if font parameters (color, size, etc.) are available (228) from the user text configuration parameters (236). If the font parameters are not available from the user, the processor extracts (220) default font parameters from the default parameters (210'). If the font parameters are available from the user, the processor extracts (230) the user defined font parameters. The processor then checks to see if the location/position parameters are available (232). If the location/position parameters are not available, then the processor extracts (222) the default location/position parameters from the default parameters (210'). If the location/position parameters are available, then the processor extracts (234) the user defined position parameters. The processor then stores (238) the text data and parameters the temporary text and parameter cache (246). The processor then check to see if the time code of the video/text data is equal to or less than the audio time code (240) retrieved from the time code cache (218'). If the time code of the video/text data is not equal to or less than the audio time code, then the processor keeps checking until the time code of the video/text data is equal to or less than the audio time code. Once the time code of the video/text data is equal to or less than the audio time code, the processor then converts (242) the digital video/text signals to analog and sends (244) them to the video delivery system.

Figure 2F:
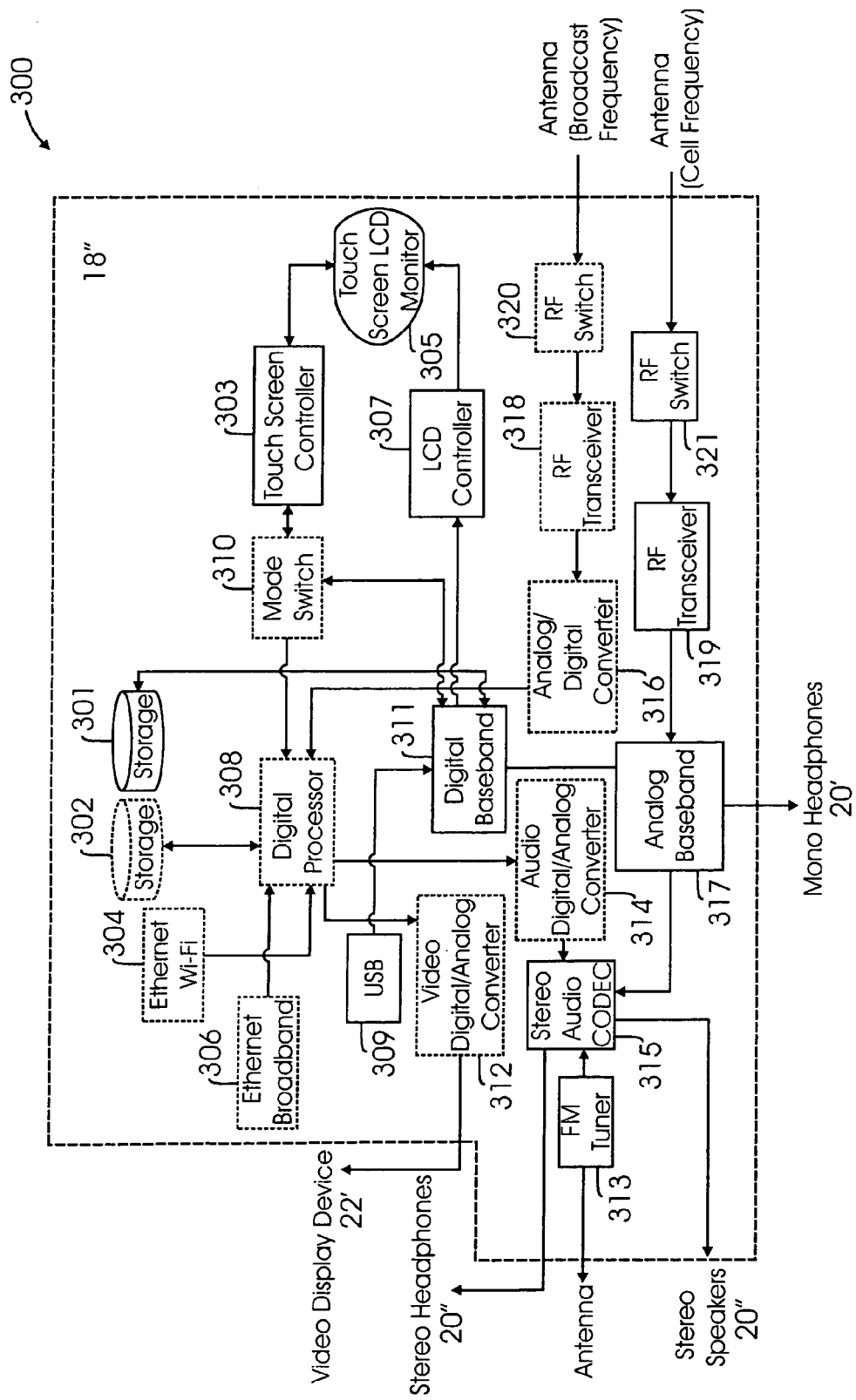
FIG. 2f is a block diagram of a cell-phone comprising a controller/receiver in accordance with an embodiment of the present invention.

A block diagram of a cell-phone comprising a controller/receiver in accordance with an embodiment of the present invention is shown in FIG. 2f. The controller/receiver/cell-phone 300 includes traditional cell-phone components 301, 303, 305, 307, 309, 311, 313, 315, 317, 319, 321 and controller/receiver components 302, 304, 306, 308, 310, 312, 314, 316, 318, and 320. A skilled artisan would appreciate that the traditional cell-phone components can be connected and be operated in the ways known to those skilled in the art to provide functions typical of a cell-phone. The controller/receiver components can be operated in the ways discussed herein.

The controller/receiver components are indicated with dashed lines. The controller/receiver/cell-phone 300 receives input from antennas capable of receiving broadcast frequencies and/or cell-phone frequencies. The controller/receiver/cell-phone 300 can include a visual display device (not shown) or provide an output that is configured to provide information to an external video display device 22'. The controller/receiver/cell-phone 300 can also provide output(s) that are configured to provide audio content for stereo headphones 20" or stereo speakers 20" or mono headphones 20'. The mode switch 310 can place the controller/receiver/cell-phone 300 in a mode for traditional cell-phone operation or a mode for operation as a controller/receiver.

The touch screen control can provide a graphical user interface to the user of the controller/receiver/cell-phone.

Figure 3B:
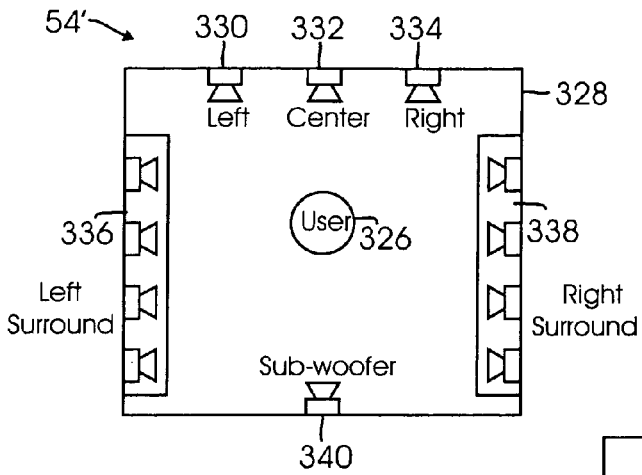
FIGS. 3b-3i are illustrations of a graphical user interface for adjusting audio content in accordance with an embodiment of the present invention.

Illustrations of a graphical user interfaces (GUIS) for adjusting audio content in accordance with an embodiment of the present invention are shown in FIGS. 3b-3i. FIG. 3b shows a GUI having speaker locations for typical theater environment with multiple channel audio in accordance with an embodiment of the present invention. The graphical user interface 54' includes a room or theater 328, a left speaker icon 330, a center speaker icon 332, a right speaker icon 334, a left surround speaker icons 336, a right surround speaker icons 338, a subwoofer icon 340 and a user icon 326. The left surround speaker icons 336 include one or more speaker icons. The right surround speaker icons 338 include one or more speaker icons.

FIG. 3a is a table that lists characteristics of a graphical user interface in accordance with an embodiment of the present invention. Some of the possible operations are listed with the corresponding modifications and comments.

Figure 3C:
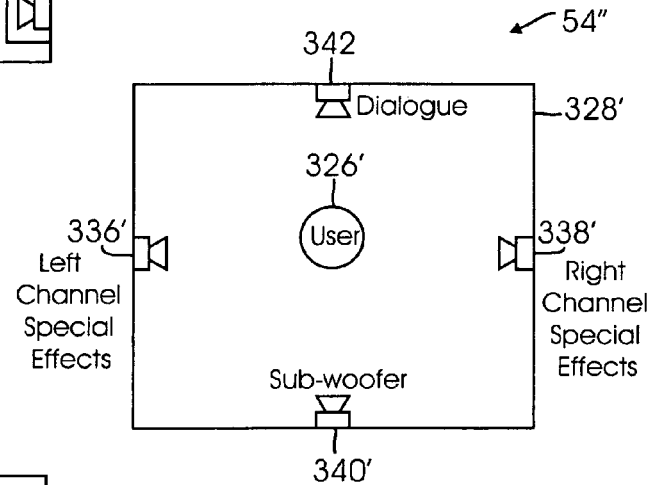
Figure 3D:
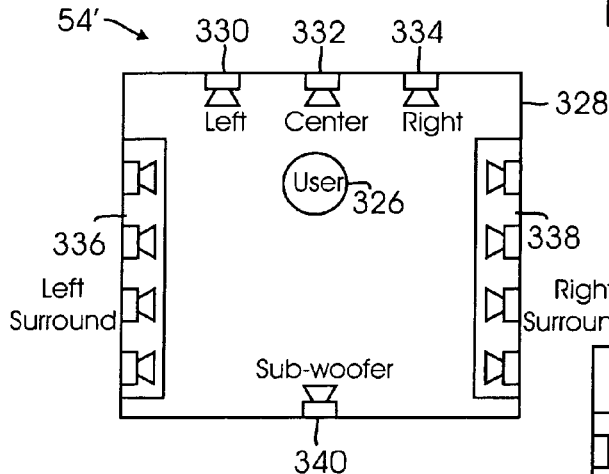

FIG. 3c shows the functional location of audio channels from a user's perspective in a typical theater environment, in accordance with one embodiment of the present invention. The GUI 54" includes a room 328', a dialog speaker icon 342, a left channel icon 336', a right channel icon 338' and a sub-woofer icon 340'. FIG. 3d shows a GUI after the user (not shown) has moved the user icon 326 closer to the center speaker icon 332, in accordance with one embodiment of the present invention. The system can respond by increasing the center, left and right channel volume and decreasing the left and right surround volume, thereby allowing the user to create and maintain an unbalanced sound condition. The magnitude of the increase or decrease (cut/gain) of volume corresponds to the distance the icon (user icon or speaker icon) is moved.

Figure 3E:
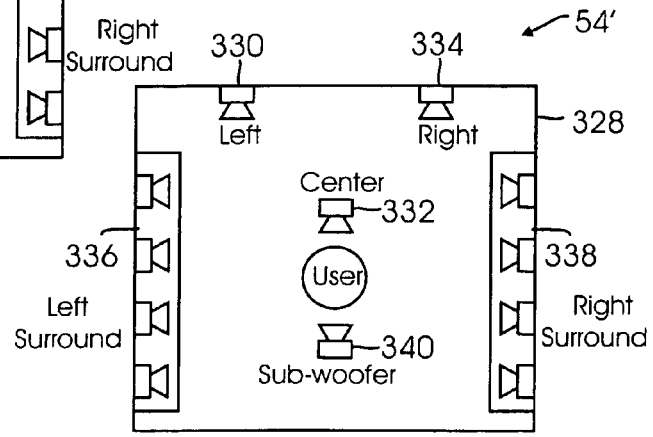

FIG. 3e shows a GUI after the user (not shown) has moved the center speaker icon 332 and sub-woofer icon 340 closer to the user icon 326, in accordance with one embodiment of the present invention. In one embodiment, the system can respond by increasing the volume of the center and sub-woofer channels and decreasing the volume of the remaining channels. In another embodiment, the system can respond by increasing the volume of the center and sub-woofer channels while maintaining the volume of the remaining channels.

The user can change or adjust the audio content by placing icons in any arrangement he desires. Moving just a few icons might constitute a minor alteration while moving several icons can be a major alteration. The effect of making an alteration can have a pronounced effect on the volume or just a minor effect.

Figures 3F, 3G, 3H, 3I:
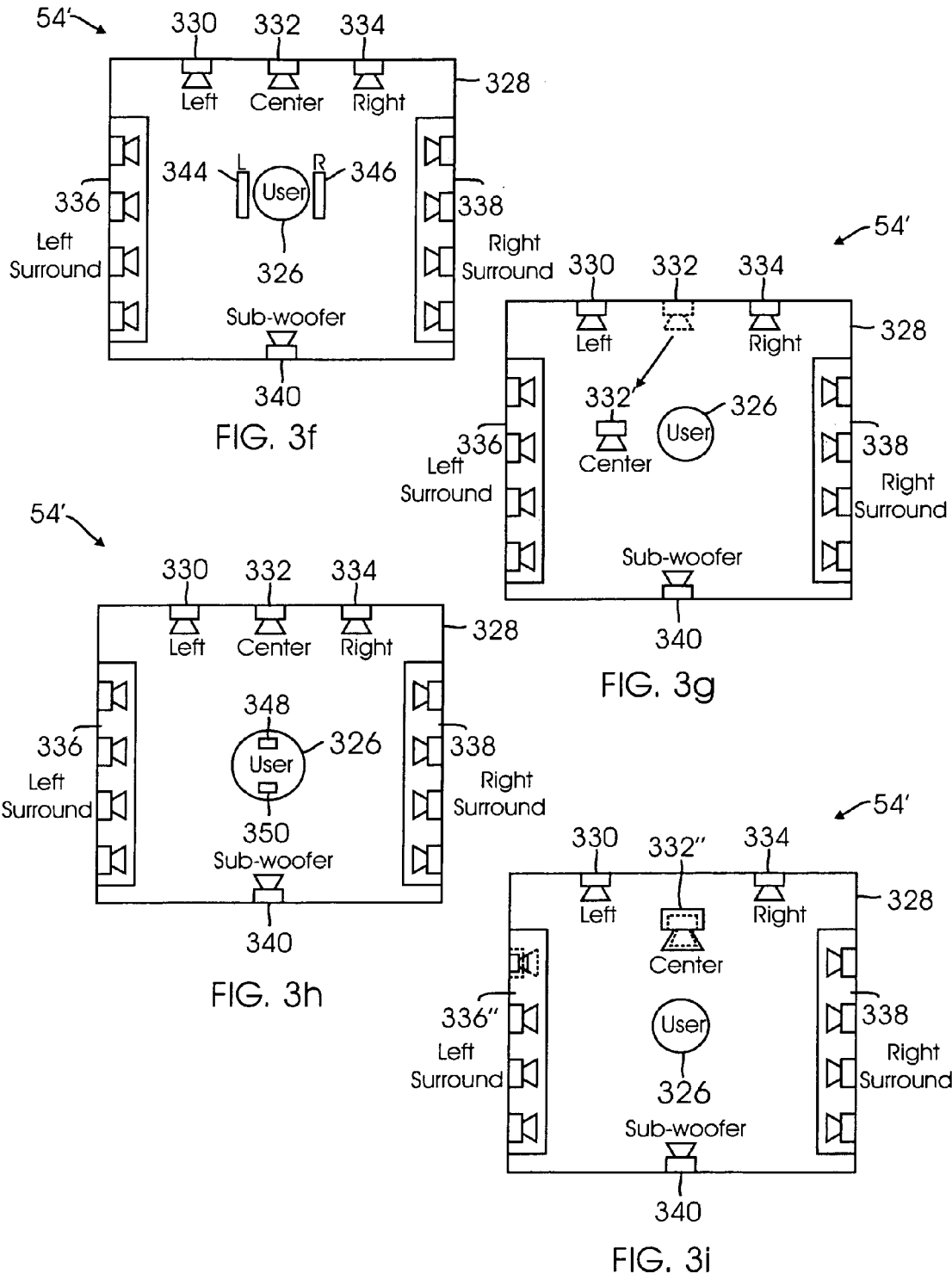

FIG. 3f shows a GUI with the addition of a left volume icon 344 and a right volume icon 346, in accordance with one embodiment of the present invention. By clicking on the left or right volume icons, the user can adjust the volume (gain/cut) of the left and right composite signals.

FIG. 3g shows a GUI after the user (not shown) has moved the center speaker icon 332 to the left side of the user icon 326, in accordance with one embodiment of the present invention. In response, the system can adjust the volume such that the center channel is now perceived by the user as originating from the left of the user.

FIG. 3h shows a GUI with the addition of a up control icon 348 and a down control icon 350. The up control icon 348 and down control icon 350 can enable the user to change whether a particular channel will be reproduced such that it is perceived as being higher or lower than the default setting. The default setting (height) may vary depending on the channel. For example, FIG. 3i shows a GUI after the user (not shown) has elevated the center channel 332' and lowered one of the left surround speakers 336", in accordance with one embodiment of the present invention.

A graphical user interface can also be used to change the characteristics of video/visual data (text) that is delivered to the user. FIG. 4a is a table that lists the characteristics of a graphical user interface that can be used to adjust the video/visual content in accordance with an embodiment of the present invention.

Figure 4B:
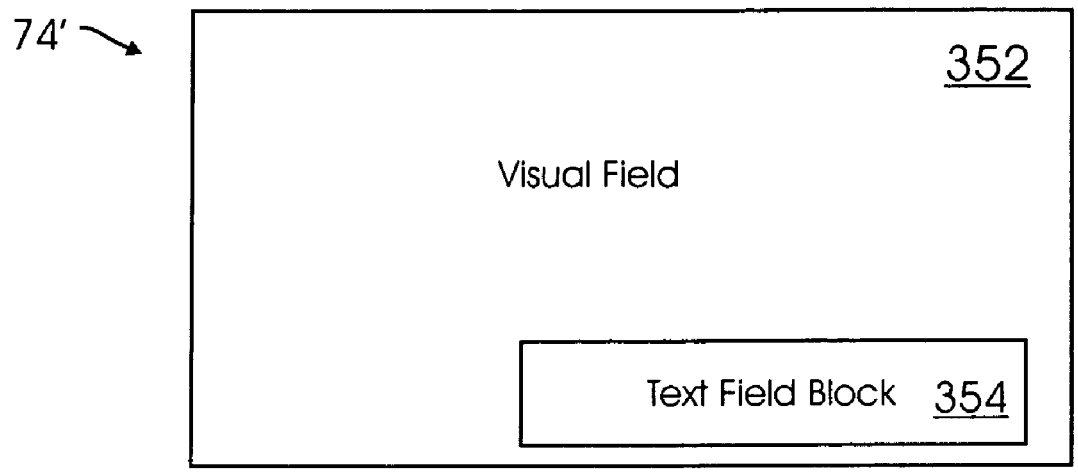
FIG. 4b is a screen shot of a video delivery system in accordance with an embodiment of the present invention.
Figure 4C:
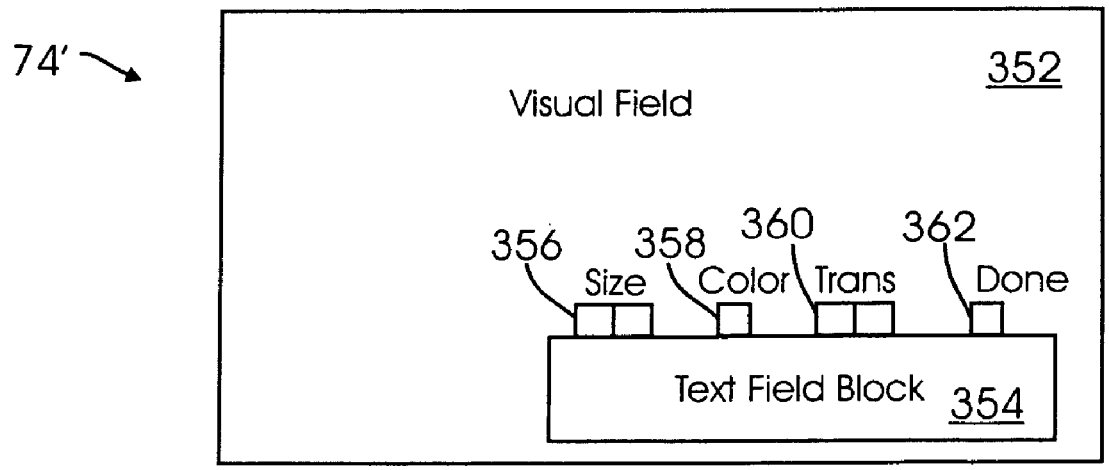
FIG. 4c is a screen shot of a graphical user interface for adjusting video content in a video delivery system in accordance with an embodiment of the present invention.

A screen shot of a video delivery system in accordance with an embodiment of the present invention is shown in FIG. 4b. A screen shot of a graphical user interface for adjusting video content in a video delivery system 74' in accordance with an embodiment of the present invention is shown in FIG. 4c. The user (not shown) can adjust the font size 356, font color 358, text transparency (trans) 360. The user can adjust the placement of the text within the user visual field 352 by moving the text field box 354.

Returning to FIG. 1b, the communication protocol between the processor/transmitter and controller/receiver involves the exchange of packets containing metadata, audio, or text data. Control bytes can be used to identify the content of the packet. Each packet/message created can start with a header identifier, for example, total number of bytes in the packet/message, identifier to receive the packet (blank if broadcast), command and sub-command identifiers (message specific), read/write identifier (message specific), audio data or metadata, and a two-byte checksum calculation.

The general message packet format in accordance with an embodiment of the present invention is illustrated in FIG. 5a. The checksum can be calculated by starting at the packet/message header (first byte) and summing all bytes up to the last data byte. The checksum can be stored in 8-bit binary format. The 2's compliment code of the least significant byte of the sum total is used in the checksum. The checksum is represented in ASCII HEX form. For example, in the following command message, with a 2-byte "number of bytes in message" filed, the first 5 bytes are summed resulting in the 8-bit code.

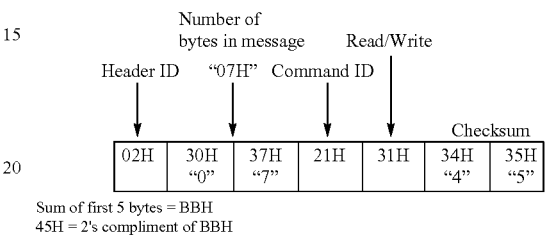

Sum of first 5 bytes = BBH
45H = 2's compliment of BBH

The 2's compliment of BBH is 45H and is stored in the last two bytes of the message (bytes 6 and 7) in ASCII HEX.

Figure 6A:
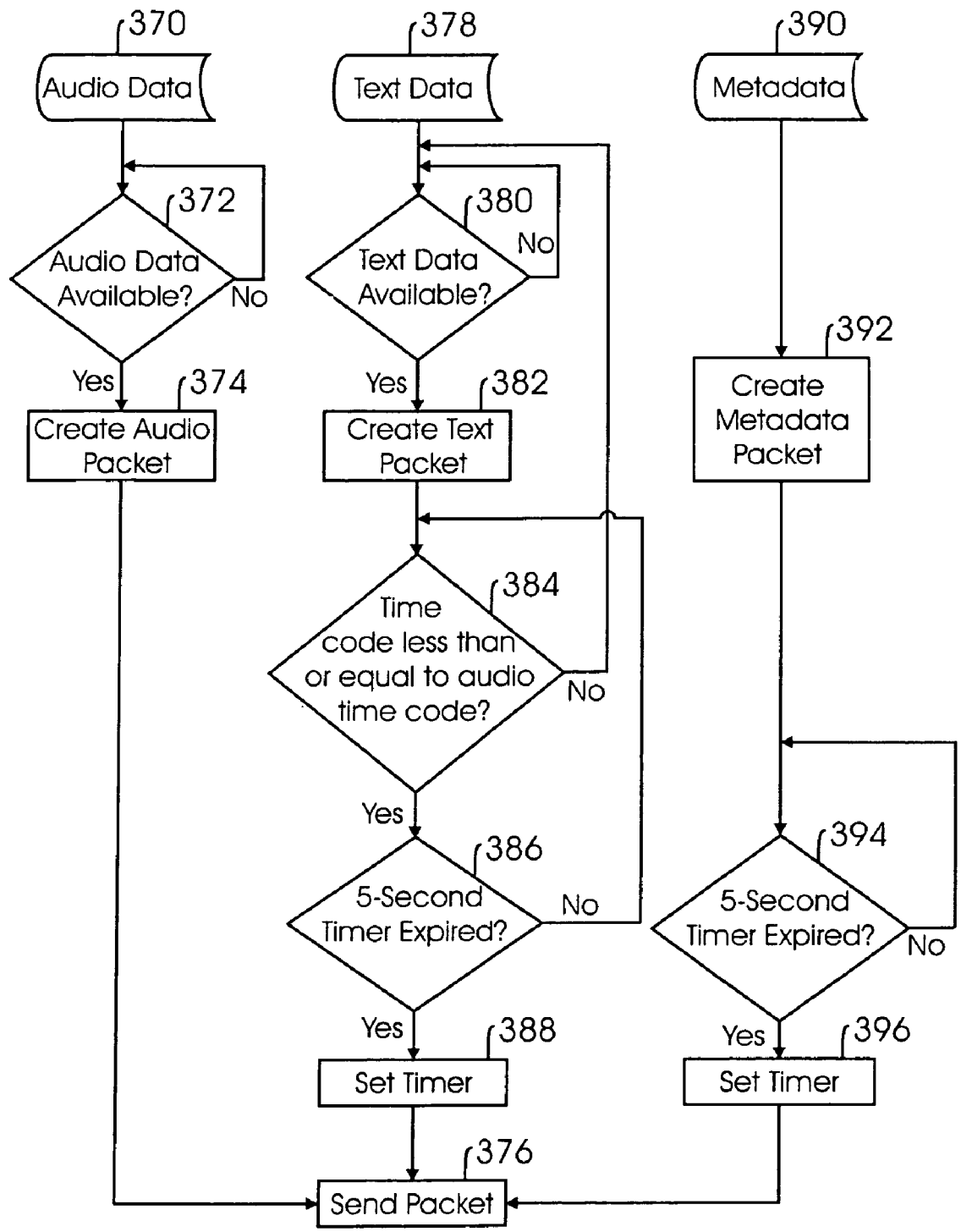
FIG. 6a is a flowchart illustrating a process for operating a processor/transmitter in accordance with an embodiment of the present invention.

A flowchart illustrating a process for operating a processor/transmitter (audiovisual server) in accordance with an embodiment of the present invention is shown in FIG. 6a. The process is provided with audio data (370), text data (378) and metadata (390). The process checks to see if audio data is available (372). If audio data is not available, then the processor keeps checking to see if audio data is available (372). If audio data is available, then the processor creates an audio packet (374) and sends (376) the packet. In one embodiment, the audio packet follows the format set out in FIG. 6d.

The processor checks to see if text data is available (380). If text data is not available, then the processor keeps checking to see if text data is available (380). If text data is available, then the processor creates (382) a text packet. In one embodiment, the text packet follows the format set out in FIG. 6e. The processor then checks to see if the text time code is less than or equal to (384) the audio time code.

If the text time code is not less than or equal to the audio time code, then the processor returns to checking if text data is available (380). If the text time code is less than or equal to the audio time code, then the processor checks to see if the five second time has expired (386). If the five second timer has not expired, the processor returns to checking if the text time code is less than or equal to the audio time code (384). If the five second timer has expired, then the processor sets (388) the timer and sends (376) the packet.

The processor creates (392) a metadata packet from the metadata (390) provided. In one embodiment, the metadata packet follows the format set out in FIG. 6c. The processor then checks to see if the five second time has expired (394). If the five second timer has not expired, the processor returns to checking if the five second time has expired (394). If the five second timer has expired, then the processor sets (396) the timer and sends (376) the packet.

Figure 6B:
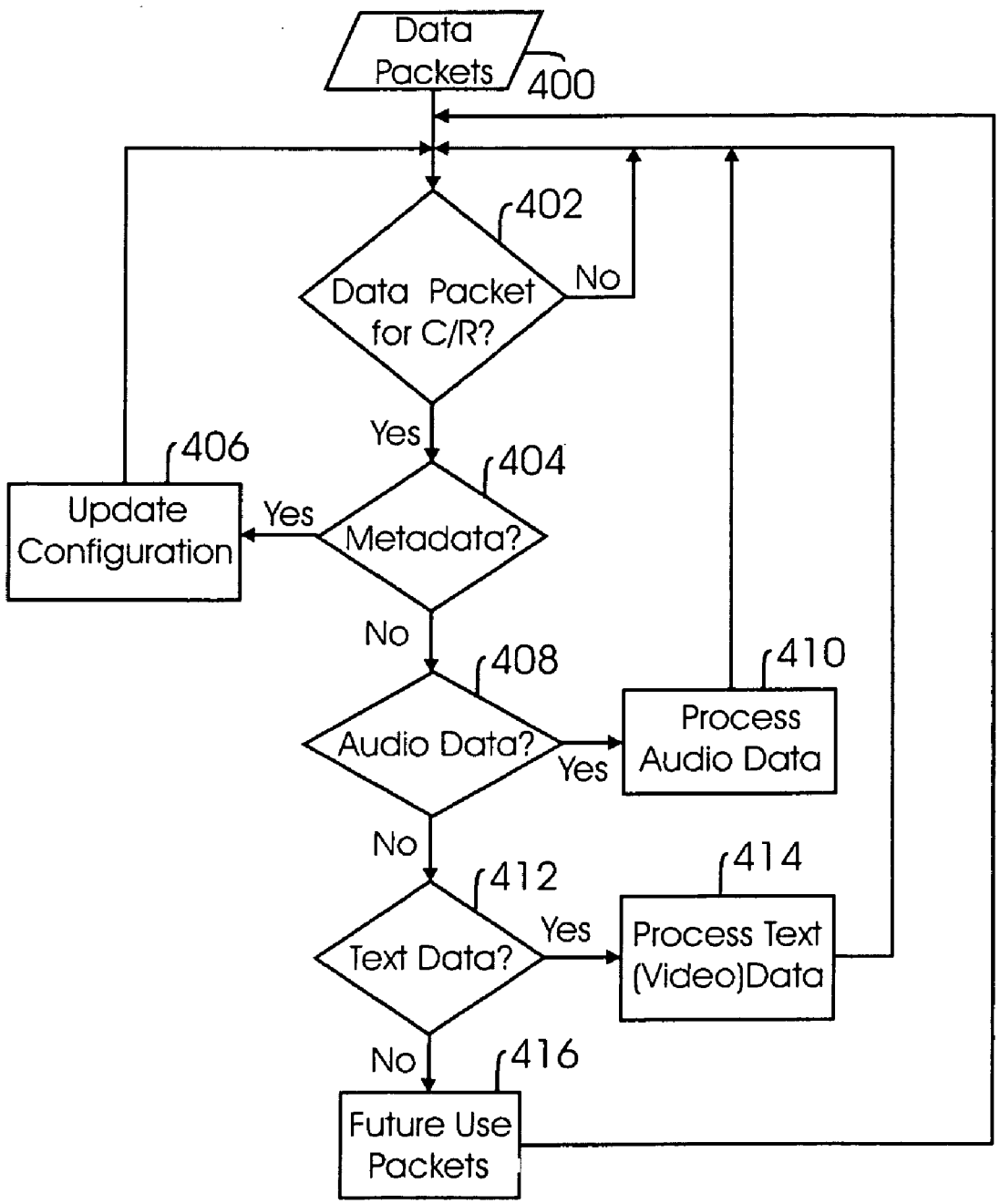
FIG. 6b is a flowchart illustrating a process for operating a controller/receiver in accordance with an embodiment of the present invention.

A flowchart illustrating a process for operating a controller/receiver (audiovisual client) in accordance with an embodiment of the present invention is shown in FIG. 6b. The process receives data packets (400). The processor checks to see if the data packet is (402) a data packet for the controller/receiver (C/R) or audiovisual client.

If the data packet is not meant for the C/R, then the processor returns to checking to see if the next data packet is meant for the C/R (402). If the data packet is meant for the C/R, then the processor determines if the data packet is a metadata packet (404). If the data packet is a metadata packet, then the processor updates (406) configuration information. In one embodiment, the configuration information can include the number of audio channels, the film title, text messages, or other pertinent information. If the data packet is not a metadata packet, then the processor checks to see if the data packet comprises audio data (408).

If the data packet comprises audio data, then the processor processes (410) the audio data and returns to checking to see if the next data packet is meant for the C/R (402). If the data packet does not comprise audio data, then the processor checks to see if the data packet comprises (412) text data. If the data packet comprises text data, then the processor processes the text/video data and returns to checking to see if the next data packet is meant for the C/R (402).

If the data packet does not comprise text data, then the processor checks for any future use packets and processes them accordingly. Future use packets by definition have not been specified, but any relevant and suitable information can be included in a future use packet to be defined in the future and as needed. After processing any future packets, the processor can return to checking to see if the next data packet is meant for the C/R (402).

In the communication protocol between the processor/transmitter (server) and controller/receiver (client), general command messages can be sent by the server to the client with specific command message information. Acknowledgment (ACK) messages can be sent by the client to the server to indicate the successful receipt of the command message sent by the server. Each command message has a specific ACK message. FIG. 6f illustrates the format of an acknowledgement packet in accordance with an embodiment of the present invention.

Non-acknowledgment (NACK) commands can be sent when the client is not able to service the incoming request (i.e., a command message was sent to the server). In one embodiment, there two types of NACK messages can be used: generic NACK messages and command specific NACK messages. Generic NACK messages generally relate to communication problems that effect all command message types. Such communication failures can include checksum errors and processor time out. Error conditions specific to the command message sent to the processor can require a non-generic NACK message. FIG. 6g illustrates the format of an NACK packet in accordance with an embodiment of the present invention.

In one embodiment, a person with impaired hearing operates a system of adjusting audiovisual content in a theater. The theater has an audiovisual server configured to receive digital media from a DVD player. The person or user has a cell-phone or PDA integrated with an audiovisual client or controller/receiver ("integrated client"). In comparison to a standard cell-phone or PDA, the integrated client includes additional components or is implemented completely in software that runs on the integrated client.

The theater begins playing a movie with the DVD player. The audiovisual server receives digital content from the DVD player, multiplexes portions of the digital content, places the digital content into packets and transmits the packets in a broadcast mode within the theater. In broadcast mode, multiple users can receive and customize the audiovisual content.

The user places the integrated client in a mode to receive packets from the audiovisual server and enables a pair of wired or wireless headphones to work with the integrated client. The audio content is played on the user's headphones. The user is presented with a graphical user interface on the integrated client such as those presented in FIGS. 3b-3i. The user customizes the icons by moving them until he feels comfortable that he has maximized his ability to hear the audio content of the movie.

In a related embodiment, the user also has a heads-up display that is wired or communicates wirelessly with the integrated client. Close-captioning text from the movie appears in the user's field of vision as depicted in FIG. 4b. The user is presented with a second graphical user interface on the integrated client as depicted in FIG. 4c. The user modifies the location, size, color, and transparency of the text according to his preferences. The user watches the movie with the audio content and video content customized for his hearing impairment(s) and/or personal preferences.

In yet another embodiment, frequency modulation can be used to adjust the audio content delivered to the user so as to further improve the hearing ability of a hearing impaired individual. Frequency modulation can be performed either on the server or client side using a well researched set of parameters intended to apply to many hearing impaired individuals.

The parameters can be designed to reduce the high frequency content of interfering noise in all channels of multichannel audio content. Research has shown that high frequency noises cause the most interference to hearing. The parameters can be included by the digital filters within the controller/receiver or another device capable of storing such information. The processor of the controller/receiver can apply the parameters to the multiple channels to provide the desired frequency modulation and/or filtering.

In another embodiment, a user can modulate frequencies with a graphical user interface that permits a user to increase or decrease the magnitude of content at a given frequency. In this case, the user interface might depict a graphical version of a stereo equalizer. The server or client providing the graphical user interface can apply the user frequency preferences to the audio content to provide the desired frequency modulation and/or filtering.

The preceding description has been presented with reference to presently preferred embodiments of the invention. These should not be construed as limitations on the scope of the invention, but rather as examples of the embodiments thereof. Alterations and changes in the described structure may be practiced without meaningfully departing from the scope and spirit of the invention.

The invention claimed is:

1. A method of adjusting audiovisual content comprising:
receiving, at a server, a first signal comprising a first content from a media source;
generating, at a server, a second content comprising multiple audio channels based on the first content;
providing, at a plurality of clients, a graphical user interface having a plurality of icons representing a user and the multiple audio channels, wherein the second content is altered by moving any of the icons on the graphical user interface;
generating, at the plurality of clients, a third signal based on the second content;
providing, at the plurality of clients, the third signal to an audio device;
increasing, at the plurality of clients, a volume of a first audio channel of the second content when a movement of an icon representing the first audio channel decreases a distance between the first audio channel icon and the user icon;

maintaining or decreasing, at the plurality of clients, a volume of the audio channels of the second content other than the first audio channel when a movement of the first audio channel icon decreases the distance between the first audio channel icon and the user icon; and allowing, at the plurality of clients, the user to maintain an unbalanced sound condition.

2. The method of claim 1, wherein the magnitude of the alteration in second content corresponds to the distance an icon was moved.

3. The method of claim 1, wherein the alteration in second content is related to the position of the plurality of icons on the graphical user interface.

4. The method of claim 1, wherein the graphical user interface is configured to allow the user to alter the volume of the multiple channels by moving the icons.

5. The method of claim 1, wherein the multiple audio channels comprise a front left channel, a front right channel, a center channel, a left surround channel, a right surround channel, and a special effects channel.

6. The method of claim 1, wherein the second content is transported in one or more packets.

7. The method of claim 6, further comprising transporting the one or more packets via a wireless connection.

8. The method of claim 1, wherein the first content comprises video content.

9. The method of claim 8, further comprising providing the video content to a video device in synchronization with the third content provided to the audio device.

10. The method of claim 9, further comprising providing a second graphical user interface to the user, where the second graphical user interface is configured to allow the user to alter the video content.

11. The method of claim 10, further comprising generating close-captioning text data based on the video content and providing the close-captioning text data to a video device.

12. The method of claim 1, wherein the graphical user interface is provided by a cell-phone or a personal data assistant.

13. The method of claim 1, further comprising:
combining, at the plurality of clients, the multiple audio channels into a right channel and a left channel;
providing, at the plurality of clients, a volume on the right channel based on input from the user; and
providing, at the plurality of clients, a volume on the left channel based on input from the user.

14. The method of claim 1, wherein the graphical user interface provides the user with an ability to modify a frequency content of each of the multiple audio channels.

15. A system for adjusting audiovisual content comprising:
a server comprising:
a receiver for receiving a first content from a media source;
a first circuitry configured to generate a second content based on the first content, the second content comprising multiple audio channels; and
a first transceiver for sending the second content;
a plurality of clients, each client comprising:
a second transceiver for receiving the second content;
an audio device; and
a second circuitry configured to generate a third content based on the second content and provide the third content to the audio device,
wherein the second circuitry is configured to provide a graphical user interface to a user, the graphical user interface having a plurality of icons representing the user and the multiple audio channels,
wherein, when a movement of an icon representing a first audio channel of the second content decreases a distance between the first audio channel icon and the user icon, the second circuitry is configured to:
increase a volume of the first audio channel; and
maintain or decrease a volume of the audio channels of the second content other than the first audio channel, and
wherein the second circuitry is configured to allow the user to maintain an unbalanced sound condition.

16. The system of claim 15, wherein a movement of a first icon of plurality of icons will alter the second content, and wherein the magnitude of the alteration in second content corresponds to the distance the first icon is moved.

17. The system of claim 15, wherein a movement of any of the plurality of icons will alter the second content, and where the alteration in second content is related to the position of the plurality of icons on the graphical user interface.

18. The system of claim 15, wherein the graphical user interface allows the user to alter the volume of the multiple channels by moving the plurality of icons.

19. The system of claim 15, wherein the multiple audio channels comprise a front left channel, a front right channel, a center channel, a left surround channel, a right surround channel, and a special effects channel.

20. The system of claim 15, wherein the second content is transported in one or more packets.

21. The system of claim 20, wherein the first transceiver sends the one or more packets to the plurality of clients via a wireless connection.

22. The system of claim 15, wherein the first content comprises video content.

23. The system of claim 22, wherein each client is configured to provide the video content to a video device in synchronization with the third content provided to the audio device.

24. The system of claim 23, wherein each client is configured to provide a second graphical user interface to the user, where the second graphical user interface is configured to allow the user to alter the video content.

25. The system of claim 24:
wherein the video content comprises text; and
wherein the second graphical user interface is configured to allow the user to alter a characteristic of the text, wherein the characteristic is selected from the group consisting of size, color, and translucence.

26. The system of claim 22, wherein the second circuitry generates close-captioning text data based on the second content and provides the close-captioning text data to a video device.

27. The system of claim 15, wherein at least one of the clients is a cell-phone or a personal data assistant.

28. The system of claim 15:
wherein the second circuitry is configured to combine the multiple audio channels into a right channel and a left channel;
wherein the second circuitry is configured to provide a volume on the right channel based on input from the user; and
wherein the second circuitry is configured to provide a volume on the left channel based on input from the user.

29. The system of claim 15, wherein the graphical user interface provides the user with an ability to modify a frequency content of each of the multiple audio channels.

30. The system of claim 15, wherein, when a movement of the first audio channel icon increases a distance between the first audio channel icon and the user icon, the second circuitry is configured to:
  decrease a volume of the first audio channel; and
  maintain a volume of the audio channels of the second content other than the first audio channel.

31. The system of claim 30, wherein, when a movement of the user icon decreases a distance between the user icon and a first icon group comprising at least one of the plurality of icons representing the multiple audio channels, the second circuitry is configured to:
  increase a volume of a first audio channel group comprising the audio channels corresponding to the icons of the first icon group; and
  maintain or decrease a volume of the audio channels of the second content other than the audio channels of the first audio channel group.

32. The system of claim 31, wherein, when a movement of the user icon increases a distance between the user icon and a second icon group comprising at least one of the plurality of icons representing the multiple audio channels, the second circuitry is configured to:
  decrease a volume of a second audio channel group comprising the audio channels corresponding to the icons of the second icon group; and
  maintain or increase a volume of the audio channels of the second content other than the audio channels of the second audio channel group.

33. The system of claim 32, wherein, when a movement of the user icon or the first audio channel icon increases or decreases a distance between the user icon and the first audio channel icon, the second circuitry is configured to maintain a position of the multiple audio channel icons other than the first audio channel icon.

34. The system of claim 30, wherein, when the user icon is moved, the second circuitry is configured to:
  increase a volume of a first audio channel group comprising audio channels corresponding to icons of a first icon group comprising icons of the plurality of icons representing the multiple audio channels where a distance between icons of the first icon group and the user icon decreased;
  decrease a volume of a second audio channel group comprising audio channels corresponding to icons of a second icon group comprising icons of the plurality of icons representing the multiple audio channels where a distance between icons of the second icon group and the user icon increased; and
  maintain a volume of a third audio channel group comprising audio channels corresponding to icons of a third icon group comprising icons of the plurality of icons representing the multiple audio channels where a distance between icons of the third icon group and the user icon is unchanged.

35. The system of claim 15, wherein an initial display of the graphical user interface comprises the user icon positioned approximately at a central location of the graphical user interface and the multiple audio channel icons positioned at points surrounding the user icon.

36. The system of claim 15:
  wherein the first content comprises video content; and
  wherein each client further comprises a video device configured to display the video content.

37. The system of claim 36, wherein the video device is a head mounted video display.

38. The system of claim 37, wherein the head mounted video display is configured to project at least a portion of the video content directly into an eye of the user.

39. A system for adjusting audiovisual content comprising:
  a server configured to:
    receive a first content from a media source; and
    generate a second content comprising multiple audio channels based on the first content; and
  a plurality of clients, where each client is configured to:
    receive the second content from the server;
    provide a graphical user interface to a user, the graphical user interface having a plurality of icons representing the user and the multiple audio channels;
    generate a third content based on the second content;
    provide the third content to an audio device;
    increase a volume of a first audio channel group comprising at least one of the multiple audio channels when a movement of the user icon decreases a distance between a first icon group, comprising the audio icons representing the audio channels of the first audio channel group, and the user icon;
    maintain or decrease a volume of the audio channels of the second content other than the audio channels of the first audio channel group when the movement of the user icon decreases the distance between the first icon group and the user icon; and
    allow the user to maintain an unbalanced sound condition.

40. The system of claim 39, wherein the graphical user interface is configured to allow the user to alter the volume of the multiple channels by moving the icons.

41. The system of claim 39, wherein each of the plurality of clients is configured to:
  combine the multiple audio channels into a right channel and a left channel;
  provide a volume on the right channel based on input from the user; and
  provide a volume on the left channel based on input from the user.

42. The system of claim 39, wherein the graphical user interface provides the user with an ability to modify a frequency content of each of the multiple audio channels.

43. A method of adjusting audiovisual content comprising:
  receiving, at a server, a first signal comprising a first content from a media source;
  generating, at a server, a second content comprising multiple audio channels based on the first content;
  providing, at a plurality of clients, an input configured to allow a user to alter the multiple audio channels;
  generating, at the plurality of clients, a third signal based on the second content;
  providing, at the plurality of clients, the third signal to an audio device;
  increasing, at the plurality of clients, a volume of a first audio channel group comprising at least one of the multiple audio channels when a movement of the user icon decreases a distance between a first icon group, comprising the audio icons representing the audio channels of the first audio channel group, and the user icon;
  maintaining or decreasing a volume of the audio channels of the second content other than the audio channels of the first audio channel group when the movement of the user icon decreases the distance between the first icon group and the user icon; and
  allowing the user to maintain an unbalanced sound condition.

44. The method of claim 43, wherein the input is configured to allow the user to alter the volume of the multiple channels.

* * * * *